United States Patent
Koh et al.

(10) Patent No.: US 8,418,158 B1
(45) Date of Patent: Apr. 9, 2013

(54) PROFILER-BASED OPTIMIZATION OF AUTOMATICALLY GENERATED CODE

(75) Inventors: David Koh, Boston, MA (US); Murat Belge, Chelmsford, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/365,986

(22) Filed: Feb. 3, 2012

Related U.S. Application Data

(63) Continuation of application No. 11/868,112, filed on Oct. 5, 2007.

(51) Int. Cl.
*G06F 9/45* (2006.01)

(52) U.S. Cl.
USPC ........... 717/151; 717/152; 717/153; 717/154; 717/158

(58) Field of Classification Search .......... 717/151–154, 717/158
See application file for complete search history.

(56) References Cited

U.S. PATENT DOCUMENTS

| | | | |
|---|---|---|---|
| 6,341,371 B1 * | 1/2002 | Tandri | 717/158 |
| 7,194,736 B2 | 3/2007 | Shi et al. | |
| 7,739,099 B2 | 6/2010 | Liu et al. | |

OTHER PUBLICATIONS

Co-pending U.S. Appl. No. 11/868,112, filed Oct. 5, 2007 entitled "Profiler-Based Optimization of Automatically Generated Code" by David Koh et al., 74 pages.
Berndl et al., "Dynamic Profiling and Trace Cache Generation," 2003, IEEE, pp. 1-10.

* cited by examiner

*Primary Examiner* — Qamrun Nahar
(74) *Attorney, Agent, or Firm* — Harrity & Harrity, LLP

(57) ABSTRACT

A device generates code with a technical computing environment (TCE) based on a model and information associated with a target processor, registers an algorithm with the TCE, automatically sets optimization parameters applied during generation of the code based on the algorithm, executes the generated code, receives feedback based on execution of the generated code, and uses the feedback to automatically update the optimization parameters and to automatically regenerate the code with the TCE until an optimal code is achieved for the target processor.

24 Claims, 20 Drawing Sheets

FIG. 9

CODE COVERAGE AND EXCLUSIVE PROFILER

FILE  EDIT  VIEW  INSERT  FORMAT

| Function | File | Line No. | Size (bytes) | Start address | Times called | % cover. | Total instr. | Cycle Total | Cycle CPU |
|---|---|---|---|---|---|---|---|---|---|
| Function1 | File1 | 123 | 56 | 0x00200 | 1 | 100 | 14 | 31 | 31 |
| Function2 | File2 | 54 | 684 | 0x00320 | 0 | 0 | 0 | 0 | 0 |
| Function3 | File3 | 21 | 212 | 0x00258 | 1 | 100 | 53 | 90 | 90 |
| Function4 | File4 | 79 | 64 | 0x00508 | 1 | 100 | 16 | 37 | 37 |

FIG. 10

STATISTICS VIEW

FILE  EDIT  VIEW  INSERT  FORMAT

| Statistics | Count | Total | Max | Average |
|---|---|---|---|---|
| loadchange_PRD | 115122 | 5.39276e+008 | 19907 | 4684.39 |
| calcStartupLoad | 1 | 0 | 0 | 0 |
| processing_SWI | 24267 | 20398744680 inst | 10563072 inst | 840596.06 |
| PRD_swi | 1151122 | 16408545952 inst | 10011008 inst | 142531.80 |
| TSK_idle | 0 | 0 inst | -2147483648 inst | 0.00 |
| IDL_busyObj | 795100 | -3.30805e+007 | -38 | -41.6054 |
| processingLoad_STS | 24267 | 2.54502e+009 | 1.32018e+006 | 104876 |

| COMPILER CONSULTANT | _ ☐ × |
|---|---|
| <u>F</u>ILE  <u>E</u>DIT  <u>S</u>IMULATION  FORMA<u>T</u>  S<u>H</u>ARE | |

File: Filename
Function: DoLoop
Lines: 17-22
Analysis:
   • Software pipelining <u>disabled</u> ⟵ 1610
Advice:
   • <u>Options</u>
   • <u>Options</u>

---

Options Advice: Missing -o
Problem:
You are compiling without <u>optimization</u> ⟵ 1620

Suggestion:
Add <u>-o2</u> or <u>-o3</u> to your compiler build options.

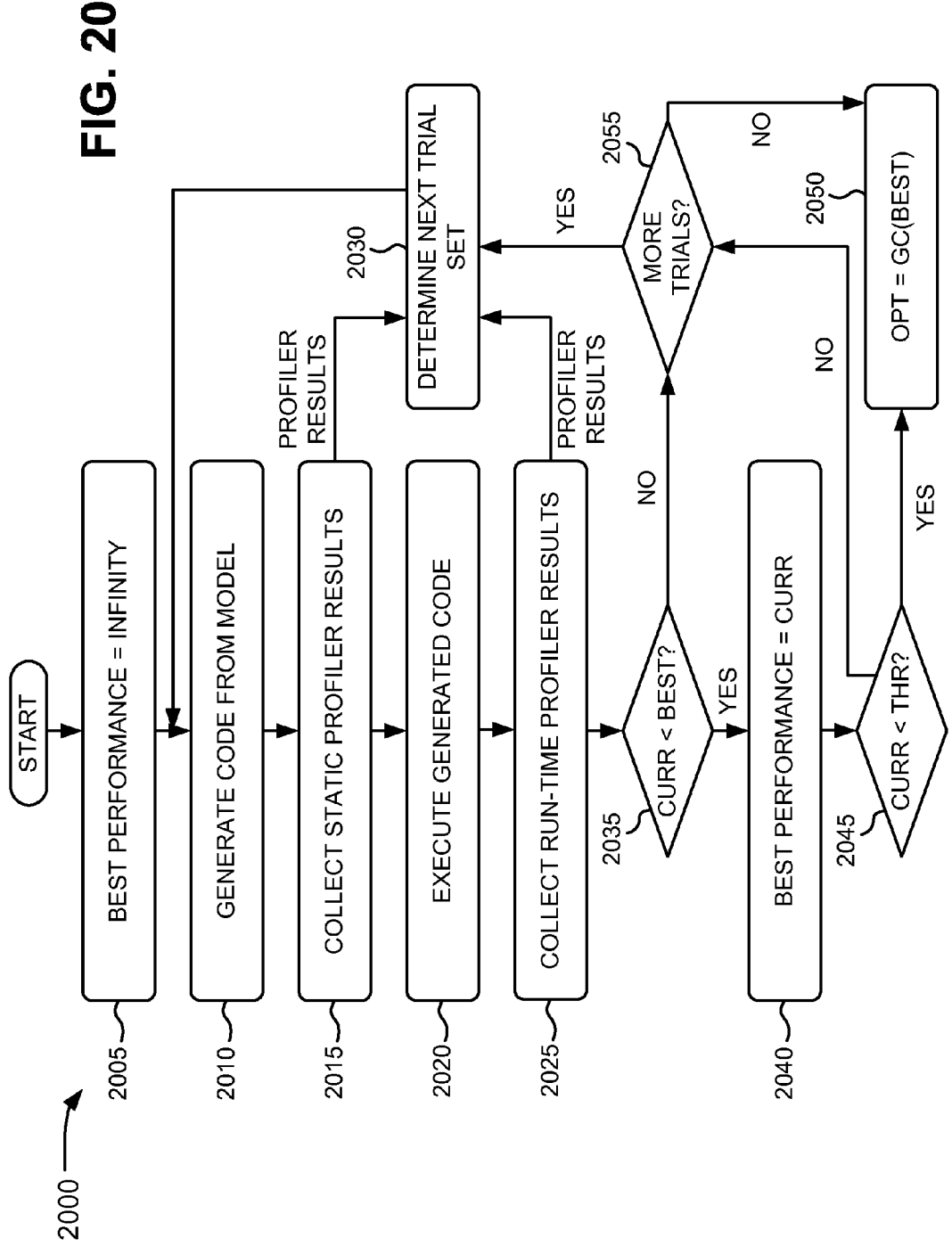

PROFILER-BASED OPTIMIZATION OF AUTOMATICALLY GENERATED CODE

RELATED APPLICATION

This application is a continuation of U.S. patent application Ser. No. 11/868,112, filed Oct. 5, 2007, the disclosure of which is incorporated by reference herein in its entirety.

BACKGROUND

One workflow aspect of deploying embedded code on a target platform is the activity of optimizing the embedded code for optimal execution performance. Many embedded processor vendors and vendors of embedded processor development environments (e.g., integrated development environments (IDEs), debuggers, build tools, etc.) provide various tools (e.g., profilers or advisors) to diagnose and characterize the run-time performance of the embedded code to improve execution performance. Such tools may include tools to measure central processing unit (CPU) usage, measure memory usage, analyze cache use, advise code changes to take advantage of an optimizing compiler, etc.

Several commercial software tools automatically generate embedded code from a simulation design model, and a subset of such tools feature profiler capabilities and/or integrate with other vendor profilers. However, the onus is on the user of such software tools to interpret the profiler feedback and to set appropriate options to regenerate the embedded code in hopes of improving performance (e.g., with respect to an optimal threshold).

BRIEF DESCRIPTION OF THE DRAWINGS

The accompanying drawings, which are incorporated in and constitute a part of this specification, illustrate one or more implementations and, together with the description, explain these implementations. In the drawings:

FIGS. 9-17 depict exemplary diagrams of user interfaces that may be provided by the device of FIGS. 1 and 2; and FIGS. 18-20 depict flow charts of exemplary processes according to implementations described herein.

DETAILED DESCRIPTION

Figure 1:
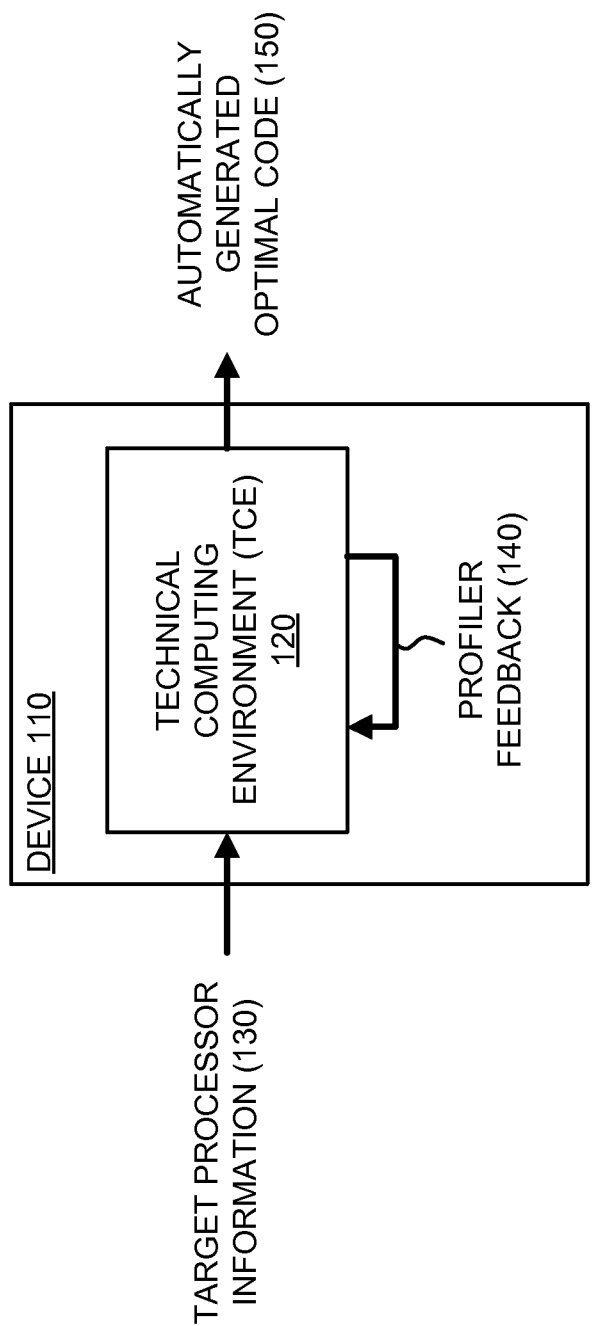
FIG. 1 is an exemplary diagram illustrating a system described herein.

The following detailed description refers to the accompanying drawings. The same reference numbers in different drawings may identify the same or similar elements. Also, the following detailed description does not limit the invention.

Overview

Implementations described herein may utilize profiler feedback to automatically generate optimal embedded code (e.g., in an execution and/or memory sense), for a target processor, with a technical computing environment (TCE). For example, in one implementation, the TCE may receive target processor information, and/or may generate embedded code based on the target processor information. The TCE may receive profiler feedback statistics based on the generated code, and/or may use the profiler feedback statistics to regenerate the embedded code until an optimal embedded code is achieved (e.g., until execution performance converges to optimal).

As used herein, the term "target processor information" is intended to be broadly interpreted to include any internal logic (e.g., hardware and/or software) attributes of a target processor. For example, target processor information may include the target processor's architecture (e.g., hardware registers, accumulators, a number of arithmetic logic units, widths of buses, hardware rounding modes to achieve numeric equivalence in simulation, rounding behavior of arithmetic and/or shift operations, etc.), the target processor's compiler behavior and/or compiler settings (e.g., software rounding mode, compiler-specific intrinsics, list of compiler-specific "#pragma", compiler-specific run-time libraries, conversions of float to fixed data types, optimization level, etc.), the target processor's operating system behavior (e.g., operating system-specific run-time libraries, etc.), any compiler-specific built-in function, assembly language, or machine code that improves execution performance with respect to the target processor, functions that enable use of function calls and variables in place of assembly mnemonics and/or registers associated with the target processor (e.g., a "MMX" single instruction, multiple data (SIMD) instruction set, Streaming SIMD Extensions (SSE), Streaming SIMD Extensions 2 (SSE2), native processor intrinsics, general purpose intrinsics, etc.), optimal target processor-specific instructions that may exhibit numerical side effects that differ from simulation (e.g., instructions to perform saturated arithmetic and/or shift operations), optimal target processor-specific C-callable intrinsics, etc.

As used herein, the term "optimal embedded code" is intended to be broadly interpreted to include any embedded code that may be optimized, e.g., by loop unrolling, removal of aliased pointers, optimization of cache usage, intelligent sizing of system stacks and/or task stacks, in-place buffer reuse, removal of scheduling bottlenecks, removal of timing issues, load balancing across tasks and/or computational components (e.g., across multiple processors), inlining functions, using intrinsics, using cache alignment, using memory banking, etc. In one example, an optimal embedded code may include any code that achieves a determined state (e.g., a theoretical optimal state or benchmark).

Exemplary System

FIG. 1 is an exemplary diagram illustrating a system 100 described herein. As illustrated in FIG. 1, system 100 may include a device 110 that includes a technical computing environment (TCE) 120 that receives target processor information 130, provides profiler feedback 140, and/or automatically generates optimal code 150. Device 110 may include an entity, such as a personal computer, a laptop, or another type of computation or communication device, a thread or process running on one of these devices, and/or an object executable by one of these devices.

A "technical computing environment" or "TCE," (e.g., TCE 120) as the terms are used herein, is to be broadly interpreted to include any hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a TCE may include a dynamically-typed programming language (e.g., the MATLAB® M language) that can be used to express problems and/or solutions in mathematical notations. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, parallel processing, etc.). In another implementation, a TCE may provide these functions as block sets. In still another implementation, a TCE may provide these functions in another way, such as via a library, etc.

A TCE may be implemented as a text-based environment (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® software, Stateflow®software, SimEvents™ software, Real-Time Workshop® software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Target processor information 130 may include any of the information described above for the term "target processor information." Profiler feedback 140 may include any feedback information capable of being generated by TCE 120 based on target processor information 130. For example, profiler feedback 140 may include processor usage, memory usage, cache usage, compiler usage, recommended code changes to take advantage of a compiler, etc. Automatically generated optimal code 150 may include any embedded code optimized by TCE 120 based on profiler feedback 140. For example, automatically generated optimal code 150 may include any of the code described for the term "optimal embedded code."

In one implementation, TCE 120 may receive target processor information 130, and/or may generate embedded code based on target processor information 130. TCE 120 may receive profiler feedback 140 based on the generated code, and/or may use profiler feedback 140 to regenerate the embedded code until optimal code 150 is achieved (e.g., until execution performance of the embedded code converges to optimal).

In an exemplary implementation, device 110 may provide a web service that permits access to one or more components of device 110. A "web service," as the term is used herein, is to be broadly interpreted to include any software application that allows machine-to-machine communications over a network (e.g., a local area network (LAN), a metropolitan area network (MAN), a wide area network (WAN), such as the Internet, etc.). For example, a web service may communicate with a client (e.g., another device) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

In one example, a customer may receive the web service on a subscription basis. A subscription may include substantially any type of arrangement, such as monthly subscription, a per-use fee, a fee based on an amount of information exchanged between the service provider and the customer, a fee based on a number of processor cycles used by the customer, a fee based on a number of resources used by the customer, etc.

Although FIG. 1 shows exemplary components of system 100, in other implementations, system 100 may contain fewer, different, or additional components than depicted in FIG. 1. In still other implementations, one or more components of system 100 may perform one or more of the tasks performed by one or more other components of system 100.

Exemplary Device Architecture

Figure 2:
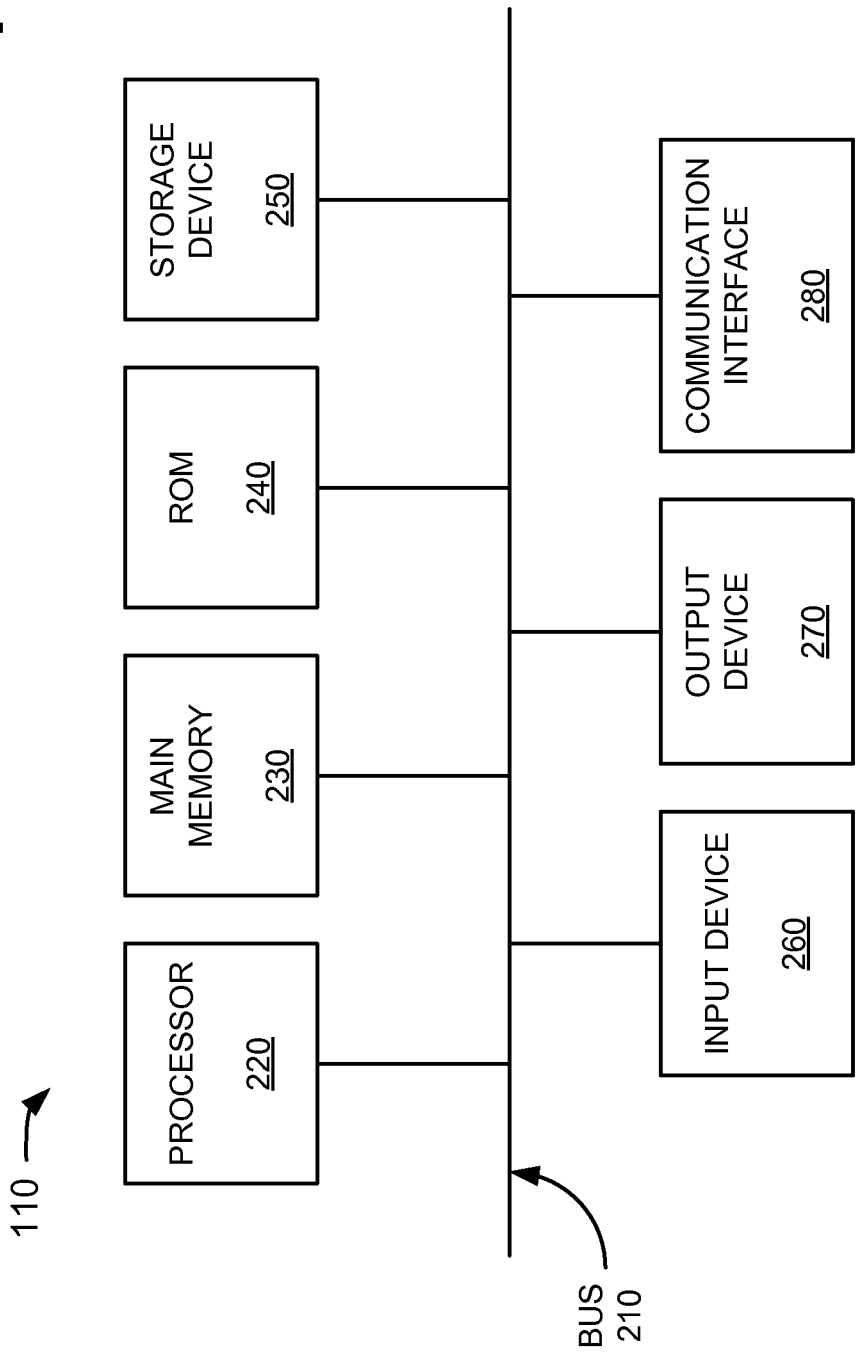
FIG. 2 is an exemplary diagram of a device of the system depicted in FIG. 1.

FIG. 2 is an exemplary diagram of device 110. As illustrated, device 110 may include a bus 210, a processor 220, a main memory 230, a read only memory (ROM) 240, a storage device 250, an input device 260, an output device 270, and a communication interface 280. Bus 210 may include a path that permits communication among the elements of device 110.

Processor 220 may include a processor, microprocessor, or processing logic that may interpret and execute instructions. For example, processor 220 may include a general processing device (e.g., a central processing unit) or another type of device, such as a reduced instruction set processor, a field programmable gate array (FPGA), a FPGA that may be configured through a hardware description language (HDL), an application specific integrated circuit (ASIC), an ASIC that may be configured through a HDL, etc. In other implementations, processor 220 may include single core devices and/or multi-core devices, or may include multiple computing devices and/or multiple processors.

Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to device 110, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables device 110 to communicate with other devices and/or systems. For example, communication interface 280 may include mechanisms for communicating with another device 110.

As described herein, device 110, consistent with exemplary implementations, may perform certain processing-related operations. Device 110 may perform these operations in response to processor 220 executing software instructions contained in a computer-readable medium, such as main memory 230. A computer-readable medium may be defined as a physical or logical memory device.

The software instructions may be read into main memory 230 from another computer-readable medium, such as storage device 250, or from another device via communication interface 280. The software instructions contained in main memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 110, in other implementations, device 110 may contain fewer, different, or additional components than depicted in FIG. 2. In still other implementations, one or more components of device 110 may perform some or all of the tasks described as being performed by one or more other components of device 110.

Exemplary Technical Computing Environment

Figure 3:
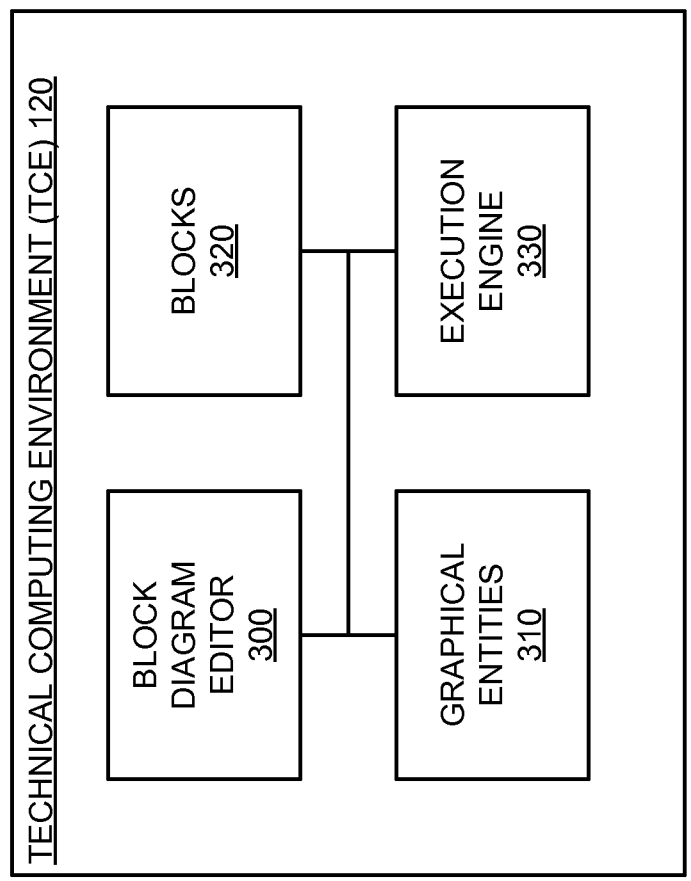
FIG. 3 is an exemplary diagram of a technical computing environment that may be used by the device of FIGS. 1 and 2.

FIG. 3 is an exemplary diagram of TCE 120 that may be used by device 110 to automatically attain optimization of generated code. In one implementation, TCE 120 may be provided within a computer-readable medium of device 110 (e.g., main memory 230, ROM 240, and/or storage device 250). In other implementations, TCE 120 may be provided in another device that is accessible by device 110 (e.g., via communication interface 280).

As shown in FIG. 3, TCE 120 may include a variety of components, such as a block diagram editor 300, graphical entities 310, blocks 320, and/or an execution engine 330. Block diagram editor 300 may graphically specify models of dynamic systems. In one implementation, block diagram editor 300 may permit a user to perform actions, such as construct, edit, display, rotate, move, annotate, save, and/or print a graphical model (e.g., a block diagram that visually and/or pictorially represents a dynamic system). In another implementation, block diagram editor 300 may permit a user to create and/or store data relating to graphical entities 310.

A textual interface with a set of commands may be provided to permit interaction with block diagram editor 300. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 310 may include entities (e.g., signal lines, buses, etc.) that represent how data may be communicated between functional and/or non-functional units and blocks 320 of a model. Blocks 320 may include elements of a block diagram model. For example, blocks 320 may include fundamental mathematical elements.

Execution engine 330 may process a graphical model to produce simulation results, may convert the graphical model from a first format into a second format (e.g., from a source representation into an executable representation (e.g., code)), and/or may perform other analyses and/or related tasks. In one implementation, for a block diagram graphical model, execution engine 330 may translate the block diagram into executable entities (e.g., executable units) following the layout of the block diagram. The executable entities may be compiled and/or executed on a device (e.g., device 110) to implement the functionality specified by the model.

Although FIG. 3 shows exemplary components of TCE 120, in other implementations, TCE 120 may contain fewer, different, or additional components than depicted in FIG. 3. In still other implementations, one or more components of TCE 120 may perform some or all of the tasks described as being performed by one or more other components of TCE 120.

Figure 4:
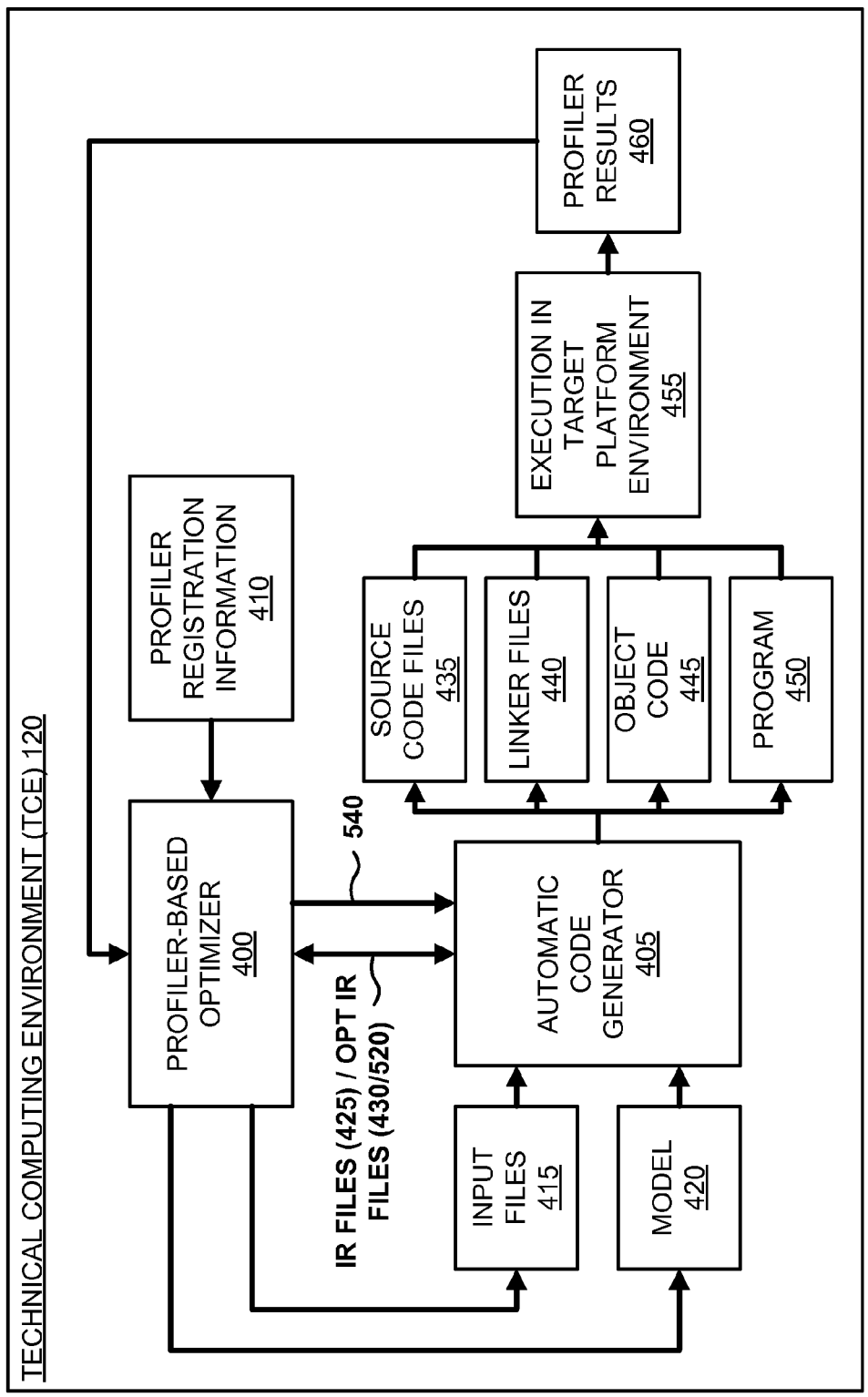
FIG. 4 is another exemplary diagram of the technical computing environment depicted in FIG. 3.

FIG. 4 is another exemplary diagram of TCE 120. As illustrated, TCE 120 may include a profiler-based optimizer 400, an automatic code generator 405, profiler registration information 410, input files 415, a model 420, intermediate representation (IR) files 425, optimized (OPT) IR files 430, source code files 435, linker files 440, object code 445, a program 450, execution in target platform environment 455, and/or profiler results 460. Although not shown in FIG. 4, TCE 120 may also include block diagram editor 300, graphical entities 310, blocks 320, and/or execution engine 330, as described above in connection with FIG. 3.

Profiler-based optimizer 400 may receive profiler registration information 410, IR files 425, and/or profiler results 460, and may generate updates for input files 415, model 420, and/or optimized IR results 430 based on the received information. In one implementation, profiler-based optimizer 400 may generate one or more updates to input files 415, model 420, and/or optimized IR files 430 for automatic code generator 405. Automatic code generator 405 may use this updated information to generate program 450 that may be optimized in terms of execution performance of resource usage for execution on one or more processors (e.g., the target processor). In other implementations, profiler-based optimizer 400 may register profiler registration information 410, and/or may update input files 415, model 420, and/or optimized IR files 430 based on profiler registration information 410. Further details of profiler-based optimizer 400 are provided below in connection with FIG. 5.

Automatic code generator 405 may receive input files 415, model 420, optimized IR files 430, and/or hardware (HW) and/or software (SW) partitioning 540 (described below in connection with FIG. 5), and may generate IR files 425, source code files 435, linker files 440, object code 445, and/or program 450 based on the received information. In one implementation, automatic code generator 405 may receive input files 425, model 420 and/or various target environment inputs and other user inputs (e.g., target processor information, etc.), and may generate target environment-specific code that can execute efficiently in a target environment. Automatic code generator 405 may execute source code files 435, linker files 440, object code 445, and/or program 450 in target platform environment 455 to generate various profiler results 460. In an exemplary embodiment, automatic code generator 405 may include the Real-Time Workshop® software available from The MathWorks, Inc. Further details of automatic code generator 405 are provided below and in connection with FIG. 6.

Profiler registration information 410 may be collected by TCE 120, and may include target processor information (e.g., target processor information 130), any feedback information capable of being generated and/or collected by TCE 120 based on target processor information 130 (e.g., processor usage, memory usage, analyze cache use, advise code changes to take advantage of a compiler, etc.), etc.

Input files 415 may include templates, commands, input parameters, object files, configuration data, source code, data and class definitions, target processor information 130, and/or any other information that may be used by automatic code generator 405 for model 420. In one implementation, input files 415 may include files that may provide input to and/or configure automatic code generator 405 to generate source code files 435 for a target hardware platform. For example, if automatic code generator 405 includes the Real-Time Workshop® software, input files 415 may include target language compiler script files (e.g., ".tlc" files). The ".tlc" files may provide sections of programming instructions to be implemented for block references (e.g., as found in model 420) during a code generation process, may provide data and/or class definitions for data element references in model 420, and/or may include compiler directives, built-in functions, and/or other code generation commands to direct automatic code generator 405 during the code generation process.

Model 420 may be generated or received by TCE 120 and may include a reference design that may be executed in simulation mode and/or may be automatically translated into target processor code that may be subsequently executed on the target processor. Model 420 may represent a design and/or an algorithm to be implemented on a device (e.g., a target processor). In one implementation, model 420 may include multiple models, with each model representing one or more components of a hardware device (e.g., a target processor). In another implementation, model 420 may include a partitioned model, with each partition representing a component of a multi-component hardware device. Model 420 may include one or more files capable of being accessed by TCE 120, profiler-based optimizer 400, and/or automatic code generator 405. In one example, model 420 may be provided by a modeling environment (e.g., TCE 120) and/or another similar modeling environment. In another example, TCE 120, profiler-based optimizer 400, and/or automatic code generator 405 may receive model 420 from an application program interface (API) call to another application or via an interface to another system.

IR files 425 may be generated by automatic code generator 405, and may include outputs provided by automatic code generator 405. For example, in one implementation, IR files 425 may include outputs from blocks generated by automatic code generator 405, results within each block, etc. IR files 425 may be updated based on profiler results 460 (e.g., by profiler-based optimizer 400) to create optimized IR files 430 for input to automatic code generator 405. Optimized IR files 430 may enable automatic code generator 405 to regenerate embedded code (e.g., program 450) until an optimal embedded code is achieved.

Source code files 435 may include program instructions of a programming language (e.g., a C programming language), may be provided in a predetermined format and/or style (e.g., following the American National Standards Institute/International Organization for Standardization (ANSI/ISO) C standard), and/or may include fixed-point and/or floating-point source code. The program instructions of source code files 435 may be generated to run on a target operating system (e.g., a real-time operating system), and/or for a target processor. The program instructions of source code files 435 may be optimized for performance, versatility, and/or a target hardware platform. Automatic code generator 405 may be configured, via input files 415, model 420, and/or optimized IR files 430, to generate custom source code files 435 that may include a style and format based on input information. Automatic code generator 405 may be configured, via input files 415, model 420, and/or optimized IR files 430, to provide custom source code files 435 that may support customizations, such as error handling, optimization, code and data reduction, code reusability, scoping of variables, and/or other characteristics of source code files 435 that may be modified during generation of source code files 435.

During generation of source code files 435, automatic code generator 405 may generate source code files 435 for each block of model 420, and may place source code files 435 and data segments of the block's source code into a uniquely named memory section. In an exemplary implementation, automatic code generator 405 may associate source code files 435 and data segments of the block's source code to a named memory section by using a compiler directive and/or a linker preprocessing directive of a programming language.

Linker files 440 may be produced by automatic code generator 405 based on input files 415, model 420, and/or optimized IR files 430. For example, automatic code generator 405 may automatically request input files 415, model 420, and/or optimized IR files 430 while automatically generating source code files 435 and/or building program 450. Automatic code generator 405 may build object code 445 into program 450 using linker files 440.

Object code 445 may include a compiled form of source code files 435, and may contain a sequence of instructions that a processor may be able to execute. Automatic code generator 405 may build source code files 435 into object code 445 and/or an executable program (e.g., program 450). For example, automatic code generator 405 may compile source code files 435 and any linker files 440, drivers, and/or other programs via a compiling utility to create object code 445 and/or program 450.

Program 450 may include a compiled and executable form of source code files 435, and may contain a sequence of instructions that a processor may be able to execute. Automatic code generator 405 may build source code files 435 into program 450, as described above. In one implementation, automatic code generator 405 may build multiple programs 450 from one or more models 420 in one or more executions. Automatic code generator 405 may produce multiple sets of source code files 435, multiple linker files 440, and/or multiple sets of object code 445 to produce multiple programs 450. In one example, each program 450 and associated source code files 435, linker files 440, and/or object code 445 may represent algorithms of model 420 to be implemented in separate threads on a given processor or on separate processors of a computational hardware device which may include communication interfaces between the processors (e.g., a communication interface to a shared memory used by the processors). Each communication interface of programs 450 may transfer data between processors, may broadcast data to multiple processors, and/or may synchronize processing across processors.

Execution in target platform environment 455 may correspond to automatic code generator 405 executing source code files 435, linker files 440, object code 445, and/or program 450 in a target environment. For example, in one implementation, execution in target platform environment 455 may correspond to automatic code generator 405 executing program 450 on a target processor. In another implementation, source code files 435, linker files 440, object code 445, and/or program 450 may be provided to target environment build tools. The target environment build tools may include build tools that use source code files 435, linker files 440, object code 445, and/or program 450 to compile and link generated code into a target environment executable code and/or memory map files. The target environment build tools may provide the target environment executable code and/or memory map files to profiler-based optimizer 400 (e.g., via profiler results 460).

Profiler results 460 may include any feedback information capable of being generated by TCE 120 based on execution in target platform environment 455. For example, profiler results 460 may include processor usage, memory usage, cache usage, compiler usage, recommended code changes to take advantage of a compiler, etc.

In one implementation, automatic code generator 405 may receive input files 415 and/or model 420, and may generate embedded code (e.g., source code files 435, linker files 440, object code 445, and/or program 450) based on the received input files 415 and/or model 420. The embedded code may be provided and/or registered in profiler-based optimizer 400 (e.g., within a rules-based optimization algorithm of profiler-based optimizer 400), and profiler-based optimizer 400 may automatically set optimization parameters to be applied during code generation (e.g., by automatic code generator 405) based on the algorithm. Profiler-based optimizer 400 may receive profiler results 460, and may determine if the generated embedded code is optimal (e.g., if execution performance of the code converges to optimal). If the embedded code is optimal, TCE 120 may output the optimal embedded code. If the embedded code is not optimal, profiler results 460 may be used (e.g., by profiler-based optimizer 400) to automatically update the optimization parameters to be applied during code generation, and automatic code generator 405 may regenerate the embedded code based on the updated information. In one example, profiler results 460 of two or more execution runs of different automatically generated embedded code may be compared (e.g., by profiler-based optimizer 400) to determine if the embedded code is optimal. In another example, profiler-based optimizer 400 may quantify execution performance effects of individual and/or groups of optimization settings to determine if the embedded code is optimal.

In another implementation, profiler-based optimizer 400 may set a best performance (e.g., execution time, where a lower execution time indicates a better performance) of previously generated code (e.g., relative to memory usage and/or execution time) to a value (e.g., infinity), and/or automatic code generator 405 may generate embedded code from model 420. Profiler-based optimizer 400 may collect static profiler results (e.g., profile results 460) based on the embedded code generated by automatic code generator 405. TCE 120 may execute the embedded code, and profiler-based optimizer 400 may collect run-time profiler results (e.g., profiler results 460) based on execution of the embedded code. The profiler results may be provided to profiler-based optimizer 400, and profiler-based optimizer 400 may determine if current performance of the embedded code relative to memory usage and/or execution performance is less than the best performance. If the current performance of the embedded code is less than the best performance (i.e., execution time of the current performance is less than the best performance execution time), profiler-based optimizer 400 may set the best performance to the current performance, and may determine if the current performance is less than a threshold (e.g., a threshold indicating optimal embedded code). If the current performance is less than the threshold, profiler-based optimizer 400 may determine that the embedded code is optimal, and may set the optimal embedded code equal to generated code corresponding to a best trial. If the current performance is greater than the best performance and/or the current performance is greater than the threshold, profiler-based optimizer 400 may determine a next trial based on the profiler results if more trials remain, and the process may be repeated until no trials remain.

Although FIG. 4 shows exemplary components of TCE 120, in other implementations, TCE 120 may include fewer, different, or additional components than depicted in FIG. 4. In still other implementations, one or more components of TCE 120 may perform some or all of the tasks described as being performed by one or more other components of TCE 120.

Exemplary Model Simulator

Figure 5:
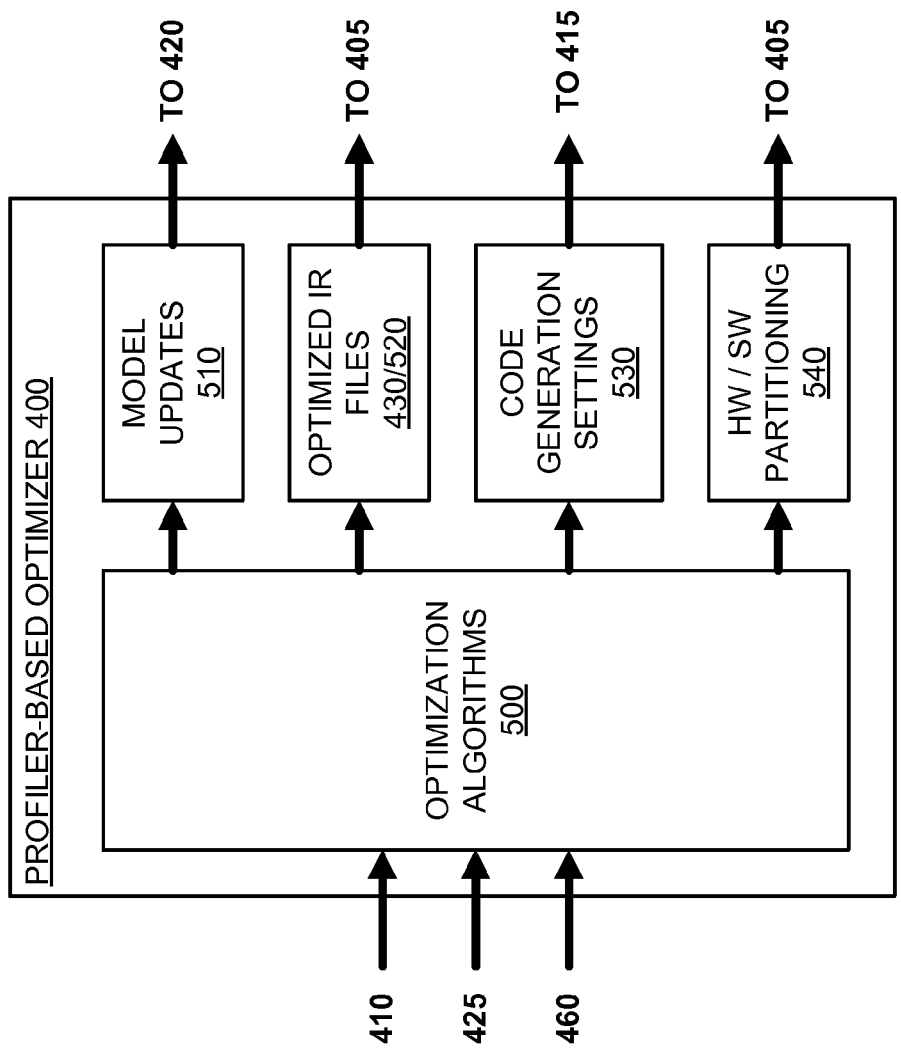
FIG. 5 is an exemplary diagram of a profiler-based optimizer of the technical computing environment depicted in FIGS. 3 and 4.

FIG. 5 is an exemplary diagram of profiler-based optimizer 400. As illustrated, profiler-based optimizer 400 may include a variety of components, such as optimization algorithms 500, model updates 510, optimized IR files 520, code generation settings 530, and/or hardware (HW) and/or software (SW) partitioning 540.

Optimization algorithms 500 may receive profiler registration information 410, IR files 425, and/or profiler results 460, may set optimization settings using internal and/or user-supplied rules-based algorithms based on the received information, and/or may generate model updates 510, optimized IR files 520, code generation settings 530, and/or HW/SW partitioning 540. In one implementation, optimization algorithms 500 may include algorithms that execute combinations of optimization settings via gradient, genetic, branch and bound, and/or other exhaustive search techniques. In other implementations, optimization algorithms 500 may be applied at different levels of a hierarchical model (e.g., at a primitive block level).

Model updates 510 may include information updating model 420 based on profiler registration information 410, IR files 425, and/or profiler results 460, and may be provided to automatic code generator 405 (e.g., via model 420). For example, model updates 510 may include information updating a reference design that may be executed in simulation mode and/or may be automatically translated into target processor code that may be subsequently executed on the target processor.

Optimized IR files 520 may include optimized IR files 430, may be provided to automatic code generator 405, and/or may enable automatic code generator 405 to regenerate embedded code (e.g., program 450) until an optimal embedded code is achieved. In one implementation, IR files 425 may be submitted to optimization algorithms 500, and optimization algorithms 500 may generate optimized IR files 520 based on IR files 425.

Code generation settings 530 may include templates, commands, input parameters, object files, configuration data, source code, data and class definitions, target processor information 130, and/or any other information that may be used by automatic code generator 405 (e.g., via input files 415) to generate code (e.g., based on model 420). In one implementation, code generation settings 530 may include information that may provide input to and/or configure automatic code generator 405 to generate source code files 435 for a target hardware platform.

HW/SW partitioning 540 may be provided to automatic code generator 405, and may include any information related to partitioning hardware and/or software associated with the code generated by automatic code generator 405.

Although FIG. 5 shows exemplary components of profiler-based optimizer 400, in other implementations, profiler-based optimizer 400 may include fewer, different, or additional components than depicted in FIG. 5. In still other implementations, one or more components of profiler-based optimizer 400 may perform some or all of the tasks described as being performed by one or more other components of profiler-based optimizer 400.

Exemplary Automatic Code Generator

Figure 6:
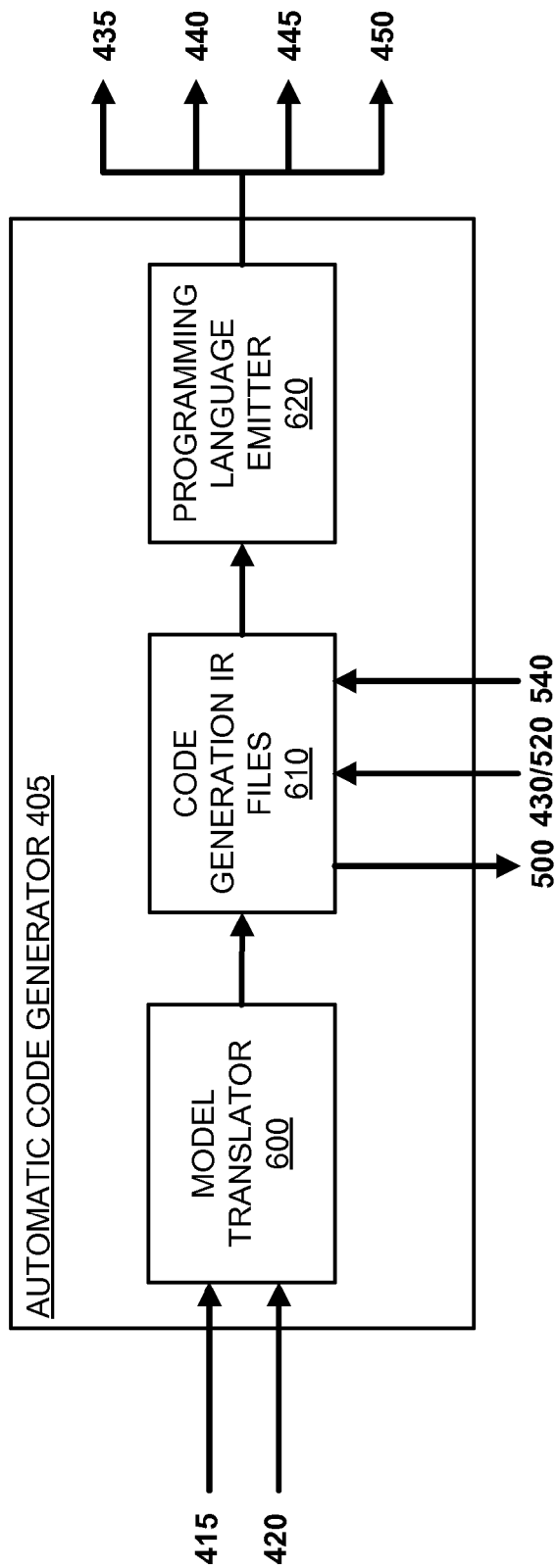
FIG. 6 is an exemplary diagram of an automatic code generator of the technical computing environment depicted in FIGS. 3 and 4.

FIG. 6 is an exemplary diagram of automatic code generator 405. As illustrated, automatic code generator 405 may include a variety of components, such as a model translator 600, code generation intermediate representation (IR) files 610, and/or a programming language emitter 620.

Model translator 600 may receive input files 415 and/or model 420, and may generate code generation IR files 610 based on input files 415 and/or model 420. For example, model translator 600 may translate input files 415 and/or model 420 into code generation IR files 610.

Code generation IR files 610 may receive optimized IR files 430/520, HW/SW partitioning 540, and/or IR files from model translator 600, and/or may convey model specifics used to generate code. Code generation IR files 610 may capture an execution behavior of automatically generated code, and may provide model specifics used to generate code to optimization algorithms 500 (of profiler-based optimizer 400) and/or programming language emitter 620. Further details of code generation IR files 610 are provided below in connection with FIGS. 7 and 8.

Programming language emitter 620 may receive model specifics from code generation IR files 610, and may use this information to generate optimal embedded code (e.g., source code files 435, linker files 440, object code 445, and/or program 450) associated with a target processor.

In an exemplary operation, automatic code generator 405 (e.g., model translator 600) may receive input files 415 and/or model 420, and may generate source code by translating model 420 into one or more source code files 435. For example, automatic code generator 405 may include the Real-Time Workshop® software and may receive model 420 generated with Simulink® software. Simulink® software may create and/or store model 420 into a model file that includes a ".mdl" file extension. As part of the code generation process, the Real-Time Workshop® software may receive a ".mdl" model file, and may analyze the model file to generate code generation IR files 610 with ".rtw" extensions. The may include a hierarchical structure of records describing systems and their blocks and connections based on the ".mdl" model file.

A language compiler (e.g., a target language compiler) may be included with the Real-Time Workshop® software, and may work with ".tlc" files and/or ".rtw" files to produce code. The target language compiler may interpret a program that reads the description of the ".rtw" file. If the target language compiler encounters a record in the ".rtw" file, it may use directives in the ".tlc" files corresponding to the record to direct the code generation process for the specific record. For example, the target language compiler may use block ".tlc" files, which may specify the particular code for a block, to transform each block into code. If the target language compiler reads a record in the ".rtw" file that references a block, the target language compiler may apply code from the corresponding block ".tlc" file to generate code for the block in source code files 435. Model wide ".tlc" files may be used to provide input to the target language compiler for global customization of the code. Model wide ".tlc" files may direct the target language compiler to generate main routines that may provide entry points into the program, source code header files that may set up data structures, and/or utility functions that may support code for particular blocks. The block and model wide ".tlc" files may be modified to generate customized code for blocks and to generate any desired global customizations to the code.

Although FIG. 6 shows exemplary components of automatic code generator 405, in other implementations, automatic code generator 405 may include fewer, different, or additional components than depicted in FIG. 6. In still other implementations, one or more components of automatic code generator 405 may perform some or all of the tasks described as being performed by one or more other components of automatic code generator 405.

Exemplary Intermediate Representation Generation

An "intermediate representation (IR)," as the term is used herein, is to be broadly interpreted to include translation of a model (e.g., model 420), a representation (e.g., a data structure that may be stored in memory, a file, a database, and/or any other acceptable storage medium), etc. An IR (e.g., IR files 425, optimized IR files 430, and/or code generation IR files 610) may be constructed from input data contained within a source language (e.g., a language used by a graphical model) and from which part or all of output data contained in a target language (e.g., a generated code) may be constructed. An IR may include a control flow graph (CFG), a data flow graph (DFG), a hybrid, and/or any other representation that preserves properties of information in the source language. An IR may allow for serial and/or parallel processing of the representation in the source language within the IR. The use of an IR may permit translation of a representation in a source language into a representation in a target language such that a system implementation may be generated from an initial system model.

An IR may be generated from a textual and/or graphical model (e.g., a model created with TCE 120) before generating code represented by a programming language (e.g., C, C++, FORTRAN, Java, etc.), a hardware description language (e.g., Verilog, etc.), a scripting language (e.g., Perl, Python, Javascript, etc.), and/or a machine or assembly language. To do this, automatic code generator 405 may parse model 420 into syntactical components and may use the syntactical components to construct an IR such that the IR may represent the semantics of model 420.

Automatic code generator 405 may allow a user to develop an IR for user-specified elements. The IR may be based on computations to be performed, and may not follow model elements (e.g., as they are presented in a graphical model).

The IR may permit optimizations to be applied across multiple elements of a graphical model.

Figure 7:
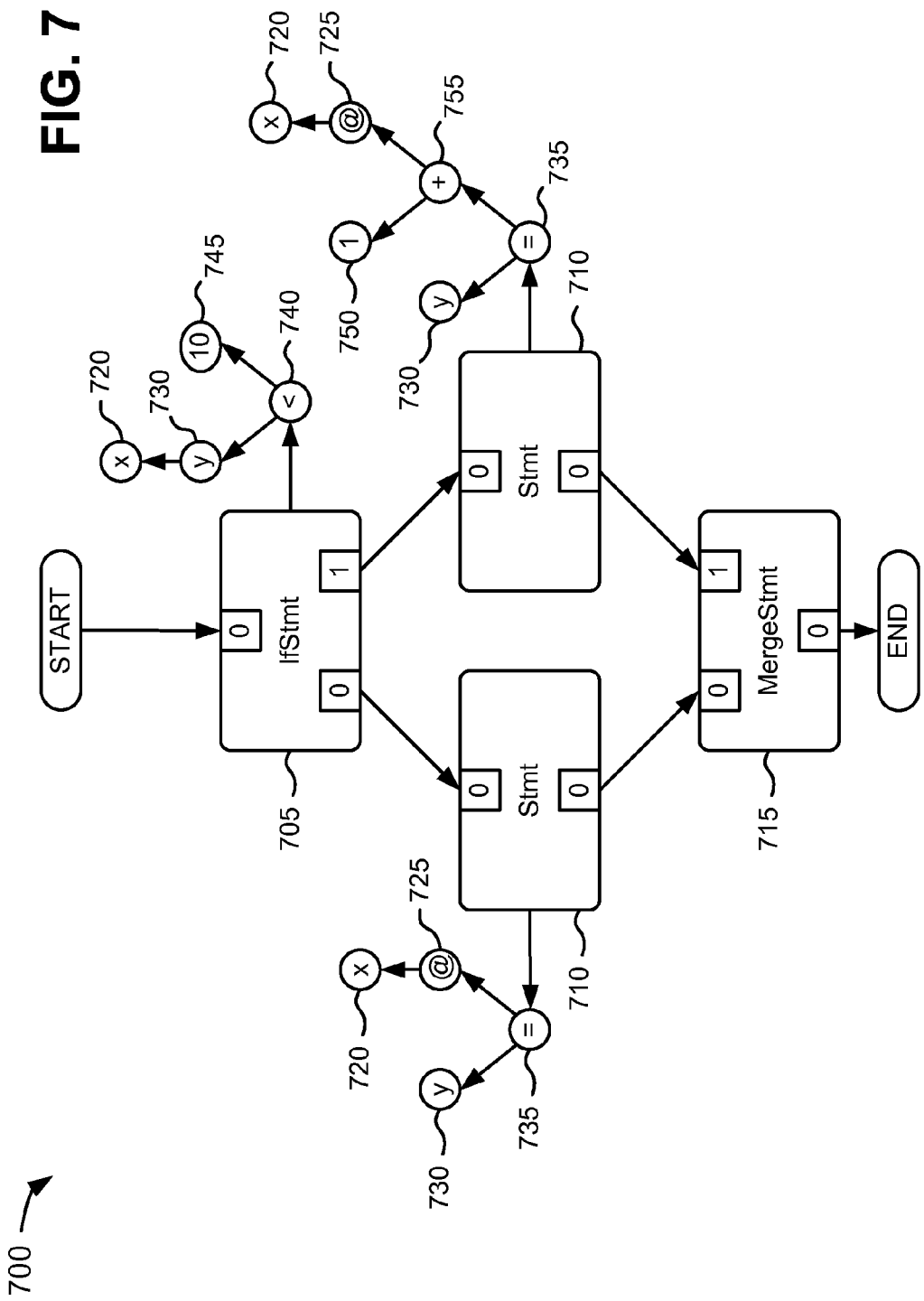
FIG. 7 is an exemplary diagram of an intermediate representation (IR) that may be generated by the profiler-based optimizer depicted in FIG. 5 and/or by the automatic code generator depicted in FIG. 6.

FIG. 7 is an exemplary diagram of an intermediate representation (IR) 700 that may be generated by profiler-based optimizer 400 and/or automatic code generator 405. As illustrated, IR 700 may contain CFG parts (e.g., reference numbers 705-715) and DFG parts (e.g., reference numbers 720-755). In this exemplary IR 700, the DFG parts may represent operations performed by assign nodes and/or a compare node of the CFG parts. The C code that may be generated from IR 700 may include the following syntax:

```
int foo(int x)
{
  int y;
  if (x<10)
    y=1+x;
  } else {
    y=x;
  }
  return y;
}
```

As shown in FIG. 7, IR 700 may begin at a Start node and may continue to an IfStmt node 705, which may evaluate an if-statement. This evaluation may provide a result of an inequality comparison between a value of a variable "x" (720) and a value of "10" (745). To access the value of a variable, a dereference may be performed, as indicated by "@" nodes 725. If an inequality "x<10" (740) holds true, the right-hand branch may be followed, as indicated by a port marked "1." IR 700 may then continue to a Stmt node 710 (right side of FIG. 7). Otherwise, a left-hand branch may be followed, as indicated by a "0" port, and IR 700 may continue to a Stmt node 710 (left side of FIG. 7). In the left-hand branch, a variable "y" (730) may be assigned a value of "x" via an "=" node 735. To access the value of variable "x" (720), a dereference may be performed, as indicated by "@" node 725. In the right-hand branch, variable "y" (730) may be assigned a sum of the value of variable "x" (720) and a value "1" (750), via an "=" node 735. A sum operator 755 may be indicated as a node marked "+" with two arguments (i.e., value "1" (750) and dereference 725 of variable "x" (720)). The two conditional flow paths may be merged, via a MergeStmt node 715, and the flow path of IR 700 may end.

Automatic code generator 405 may perform the following exemplary operations on code generation IR files 610. Automatic code generator 405 may parse model 420, and may generate one or more IRs (e.g., code generation IR files 610) from the parsed model 420. In one example, the IR may be a control flow graph (CFG) that captures semantics of model 420. An IR represented by a CFG may include nodes that represent algorithmic aspects of model 420, and may include edges that indicate a flow for the algorithms. For example, the edges may indicate processing flow of model 420. Subsequently, automatic code generator 405 may generate code (e.g., via program language emitter 620) from the one or more IRs.

Figure 8:
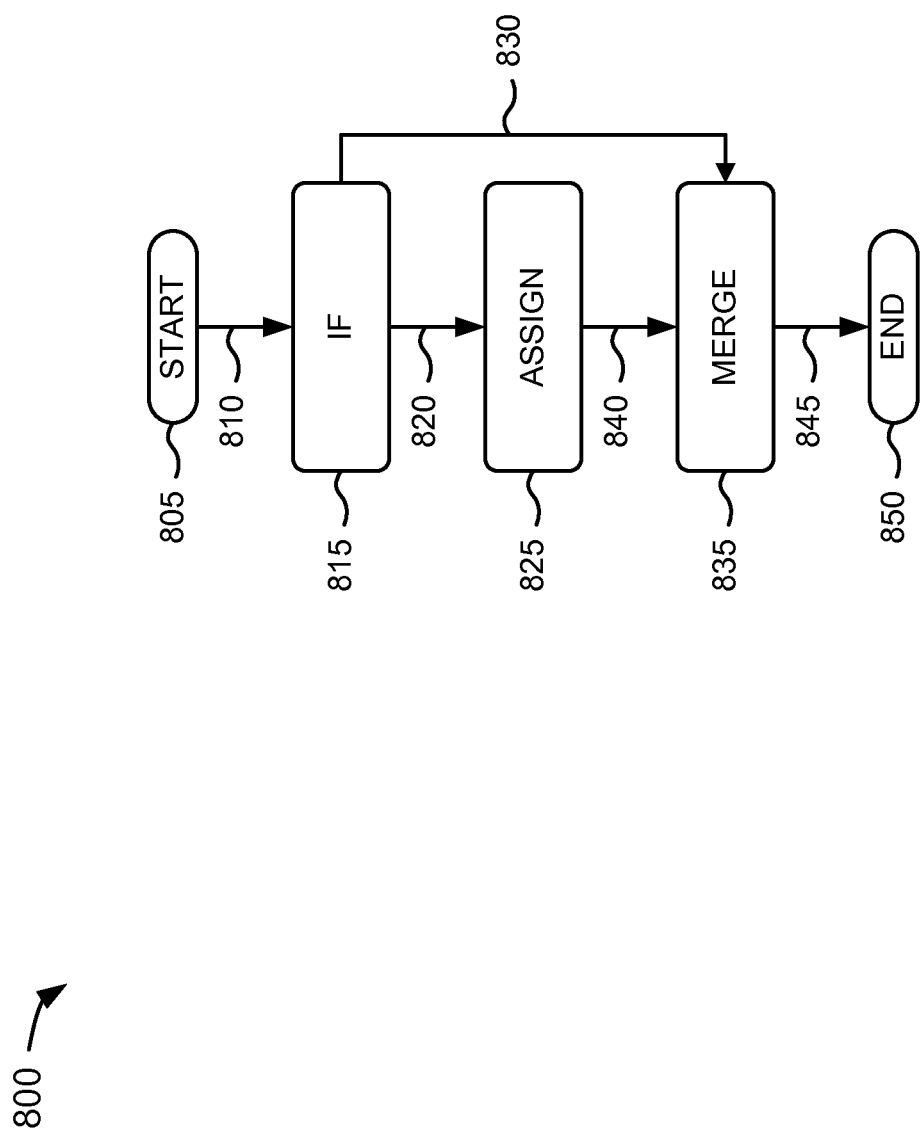
FIG. 8 is an exemplary control flow graph of an intermediate representation that may be generated by the profiler-based optimizer depicted in FIG. 5 and/or by the automatic code generator depicted in FIG. 6.

FIG. 8 depicts an exemplary control flow graph 800 of an IR that may be generated by construction and general transformation phases of a code generation process. Control flow graph 800 may begin with a start node 805, and may proceed to a conditional node 815 via an edge 810. Conditional node 815 may provide an evaluation of a condition. If the condition is false, control flow graph 800 may proceed to a merge node 835 via an edge 830. If the condition is true, control flow graph 800 may proceed to an assign node 825 via an edge 820. Assign node 825 may assign a value to a variable and may be based on an algebraic equation. Assign node 825 may proceed to merge node 835 via an edge 840. Merge node 835 may perform a merge function and may proceed to an end node 850 via an edge 845.

In one implementation, an IR may be transformed into another IR to arrive at a lower-level representation that may be converted into a desired low level target language. A process of transforming an IR into a lower-level representation may be referred to as "lowering." There may be many stages of lowering processes in the transformation of an IR into a lower-level representation. The same and/or a similar lowering process may be employed more than once. Lowering processes may transform the IR into a state that may be suitable to a backend of a code generation process. If an IR has been transformed into a lower-level representation, a backend utility may be used (e.g., by automatic code generator 405) to generate code in a target language. Such lowering may be performed in a hierarchy. For example, a first portion of a model (e.g., a subsystem) may go through three levels of lowering while a second portion of the model may go through two levels of lowering.

Profiler-based optimizer 400 and/or automatic code generator 405 may include a transformer that may convert a first IR into a second IR. The first IR may represent algorithmic aspects (e.g., additions, multiplications, logic evaluations at decision points to determine branches of computation, function evaluations, etc.) of an element of a graphical model (e.g., model 420). The transformer may transform the first IR by replacing an integration operation with basic operations that may be directly computed. To this end, the transformer may attempt to match a pattern in the generated IR of an element and/or a portion of a graphical model. The transformer may identify a pattern in the generated IR that matches a pattern (e.g., a pattern depicted in a graphical representation), and may replace the identified pattern in the generated IR with another pattern (e.g., another pattern depicted in a graphical representation).

In one example, the transformer may analyze and transform the first IR into the second IR (which may be simulated). If the first IR is represented by a CFG, the transformer may identify nodes of the CFG that are not supported by a simulator and may replace the non-supported nodes with basic operations that may be supported by the simulator. The transformation may result in the second IR, which may be simulated.

Pattern matching may be implemented in various ways, but may be guided by heuristics to manage computational complexity. Modular and hierarchical graph rewriting techniques may further improve the transformation efficiency. The transformer may employ any number of rewriting rules that may be extended by textual transformation information. The rewriting rules may include negativity constraints.

In one implementation, profiler-based optimizer 400 and/or automatic code generator 405 may apply an optimization technique to generate a second IR from a first IR. Applying optimization techniques to an IR may improve characteristics of the generated code (e.g., program 450) by, for example, reducing execution time and/or required storage space, and/or may improve efficiency and/or effectiveness of the generated code and/or the code generation process. For example, if a vector is used in a finite state machine model and a target language is the C programming language, then one of the lowering processes may include transforming calculations related to the vector into a for loop.

Optimization techniques may further increase conformance to industrial standards and/or target environment (e.g., TCE 120) requirements (e.g., optimization techniques may increase an ability to generate code that is compatible with such standards/requirements). Applying optimization techniques to IRs may reduce a size of code generated from the IRs. For example, the size of the generated code may determine resource usage if the generated code is compiled into a list (e.g., a netlist) for hardware layout. Applying optimization techniques to IRs may also reduce an overall size of variables used in the generated code.

In one implementation, the application of optimization techniques by profiler-based optimizer 400 and/or automatic code generator 405 may be iterative. In another implementation, there may be multiple transitions of the IRs before the optimization techniques may be applied, and there may be multiple transitions of the IRs while applying the optimization techniques. At each transition, one or more optimization techniques may be applied by profiler-based optimizer 400 and/or automatic code generator 405. In other implementations, an optimization technique may be applied multiple times during the code generation process.

In one implementation, profiler-based optimizer 400 and/or automatic code generator 405 may debug IRs as follows. Profiler-based optimizer 400 and/or automatic code generator 405 may implement associations between elements in a graphical model and nodes in an IR. For example, a user may set breakpoints on execution of elements in the graphical model, which may cause execution to halt at corresponding operation in the IR. Profiler-based optimizer 400 and/or automatic code generator 405 may map data in the IR back to the graphical model to enable debugging of the graphical model. For example, an IR may include meta tags to identify derivation of content of the IR. A meta tag may associate the IR content with content that may be used to generate the IR. The content of an IR may be derived from, for example, elements in a graphical model, optimization rules, model configuration options, etc.

Profiler-based optimizer 400 and/or automatic code generator 405 may provide an optimized IR that combines computations of elements. If a value from one element is to be displayed, profiler-based optimizer 400 and/or automatic code generator 405 may substitute a more detailed and/or less optimized IR if requested during execution. For profiling purposes, profiler-based optimizer 400 and/or automatic code generator 405 may maintain an amount of computational time that is spent in parts of the IR. This information may be presented to the user in terms of elements of the model.

In one implementation, profiler-based optimizer 400 may generate an IR (e.g., optimized IR files 430) for simulation. For example, profiler-based optimizer 400 may generate the following pseudo code to support a computational simulation.

```
1. //
2. // Generate intermediate representation for
3. // discrete integration of Y=X+U*Ts
4. //
5. // Retrieve data
6. DataStore*U=get_block_input(block);
7. DataStore*Ts=get_block_sample_time(block);
8. DataStore*X=get_block_state(block);
9. DataStore*Y=get_block_output(block);
10. DataStore*tmpData=create_temp_data_store( )
11. //
12. // Construct simulation operation of tmpData=U*Ts
13. SimOpNode*op1=create_sim_op_multiply(tmpData, U, Ts);
14. //
15. // Construct simulation operation of Y=X+tmpData
16. SimOpNode*op2=create_sim_op_add(Y, X, tmpData);
17. //
18. // Create an object of intermediate representation
19.         IRGraph irGraph=create_intermediate_representation_graph( )
20. //
21. // Insert the simulation operations to the intermediate representation
22. irGraph→insert(op1);
23. irGraph→insert(op2);
```

The pseudo code may generate an IR for a discrete integration block. From line 6 to line 10 of the pseudo code may retrieve data stores for the discrete integration in the form of a data structure "DataStore." The data structure "DataStore" may include information about data (e.g., data type, dimension, complexity, memory storing the data, etc.). Line 13 of the pseudo code may generate a simulation operation node that multiplies an input "U" with a sample time "Ts" and may save results in a temporary data structure "DataStore tmpData." A data structure "SimOpNode" may include information about a simulation operation (e.g., operation type, input and output operation data, rounding and saturation mode, execution rate, simulation operation routines, etc.). Line 16 of the pseudo code may generate a second simulation operation node that adds a state "X" with "tmpData" and may save a result in a data structure "DataStore Y." In line 19 of the pseudo code, a data structure "IRGraph" may be created, may contain information about the IR (e.g., simulation operations, execution order, etc.), and may include a control flow graph. Lines 22 and 23 of the above pseudo code may add two simulation operations to the data structure "irGraph."

Although FIGS. 7 and 8 depict exemplary information associated with IRs, in other implementations, the IRs may include fewer, different, or additional information than depicted in FIGS. 7 and 8.

Exemplary User Interfaces

FIGS. 9-17 depict exemplary diagrams of user interfaces 900-1700 that may be provided by device 110. Each of user interfaces 900-1700 may include one or more software and/or hardware components that provide displays to a user of device 110. Each of user interfaces 900-1700 may include a graphical user interface (GUI) or a non-graphical user interface, such as a text-based interface, and/or other forms of APIs that may be programmatically accessed. Each of user interfaces 900-1700 may provide display information to users (e.g., users of device 110) via a customized interface (e.g., a proprietary interface) and/or other types of interfaces (e.g., a browser-based interface). Each of user interfaces 900-1700 may receive user inputs via one or more input devices (e.g., input device 260), may be user configurable (e.g., a user may change the size of the user interface, information displayed in the user interface, color schemes used by the user interface, positions of text, images, icons, windows, etc., in the user interface, etc.), and/or may not be user configurable. Each of user interfaces 900-1700 may be displayed to a user via one or more output devices (e.g., output device 270).

As shown in FIG. 9, user interface 900 may provide exemplary profiler feedback information (e.g., provided by profiler results 460). For example, user interface 900 may include a table 905 that provides code coverage information (e.g., via fields and records). Table 905 may include a variety of fields providing code coverage information, such as a function field 910, a file field 915, a line number field 920, a size field 925, a start address field 930, a times called field 935, a percent coverage field 940, a total instructions field 945, a cycle total field 950, and/or a cycle CPU field 955.

Function field 910 may include information about a function of the code (e.g., a record of function field 910 indicates a function name "Function1"). File field 915 may include information associated with a file corresponding to the function provided in function field 910 (e.g., a record of file field 915 may include an entry "File1"). Line number field 920 may include a line number(s) of the code that corresponds to the function provided in function field 910 (e.g., a record of line number field 920 may include an entry "123" indicating that "Function1" is located on line number "123" of the code). Size field 925 may include size information (e.g., in bytes) that corresponds to the file provided in file field 915 (e.g., a record of size field 925 may include an entry "56" indicating that "File1" has a size of "56 bytes").

Start address field 930 may include a start address corresponding to the function provided in function field 910 (e.g., a record of start address field 930 may include an entry "0x00200" indicating that "Function1" has a start address of "0x00200"). Times called field 935 may include a number of times the function provided in function field 910 is called by the code (e.g., a record of times called field 935 may include an entry "1" indicating that "Function1" was called once by the code). Percent coverage field 940 may include a percent coverage by the function provided in function field 910 (e.g., a record of percent coverage field 940 may include an entry "100" indicating that "Function1" has 100% coverage).

Total instructions field 945 may include a number of instructions of the function provided in function field 910 (e.g., a record of total instructions field 945 may include an entry "14" indicating that "Function1" has "14" instructions). Cycle total field 950 may include a total number of cycles executed by the function provided in function field 910 (e.g., a record of cycle total field 950 may include an entry "31" indicating that "Function1" executed "31" cycles). CPU cycle field 955 may include a number of CPU cycles executed by the function provided in function field 910 (e.g., a record of CPU cycle field 955 may include an entry "31" indicating that "Function1" executed "31" CPU cycles).

As shown in FIG. 10, user interface 1000 may include profiler feedback information associated with statistics (e.g., provided by profiler results 460). For example, user interface 1000 may include a table 1010 that provides statistics information (e.g., via fields and records). Table 1010 may include a variety of fields providing statistical information, such as a statistics field 1020, a count field 1030, a total field 1040, a maximum (Max) field 1050, and/or an average field 1060.

Statistics field 1020 may include information about statistics (e.g., calculated by profiler-based optimizer 400 based on profiler results 460) related to embedded code (e.g., a record of statistics field 1020 may include a statistic name "loadchange_PRD"). Count field 1030 may include a count number (e.g., a number of times a function is called) corresponding to the statistic provided in statistics field 1020 (e.g., a record of count field 1030 may include an entry "115122"). Total field 1040 may include execution times (e.g., in terms of number of clock cycles or instruction cycles) corresponding to the statistic provided in statistics field 1020 (e.g., a record of total field 1040 may include an entry "5.39276e+008"). Maximum field 1050 may include a maximum number corresponding to the statistic provided in statistics field 1020 (e.g., a record of maximum field 1050 may include an entry "19907"). Average field 1060 may include an average number corresponding to the statistic provided in statistics field 1020 (e.g., a record of average field 1060 may include an entry "4684.39").

Figure 11:
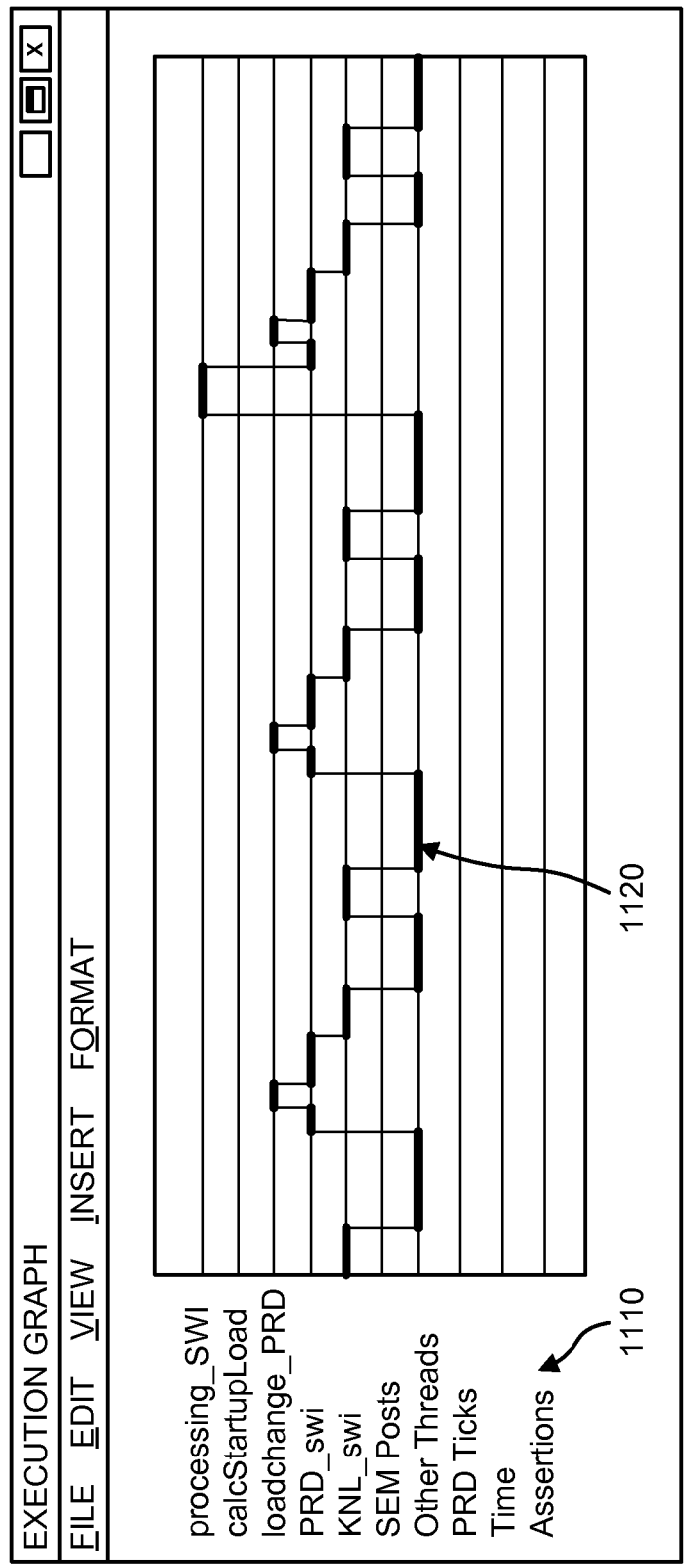

As shown in FIG. 11, user interface 1100 may include profiler feedback information (e.g., provided by profiler results 460) associated with execution of an embedded code. For example, user interface 1100 may include a graph indicating execution of various exemplary functions 1110 or the execution of other relevant events of the embedded code (e.g., "processing_SWI," "calcStartupLoad," "loadchange_PRD," "PRD_swi," "KNL_swi," "SEM Posts," "Other Threads," "PRD Ticks," "Time," and/or "Assertions"). As further shown in FIG. 11, user interface 1100 may include various lines 1120 indicating that one of functions 1110 executed for an amount of time (e.g., as indicated by lengths of lines 1120). Lines 1120 may further provide an indication of the order of execution of exemplary functions 1110. For example, lines 1120 may indicate that the function "KNL_swi" is executed first, the function "Other Threads" is executed second, the function "PRD_swi" is executed third, etc.

Figure 12:
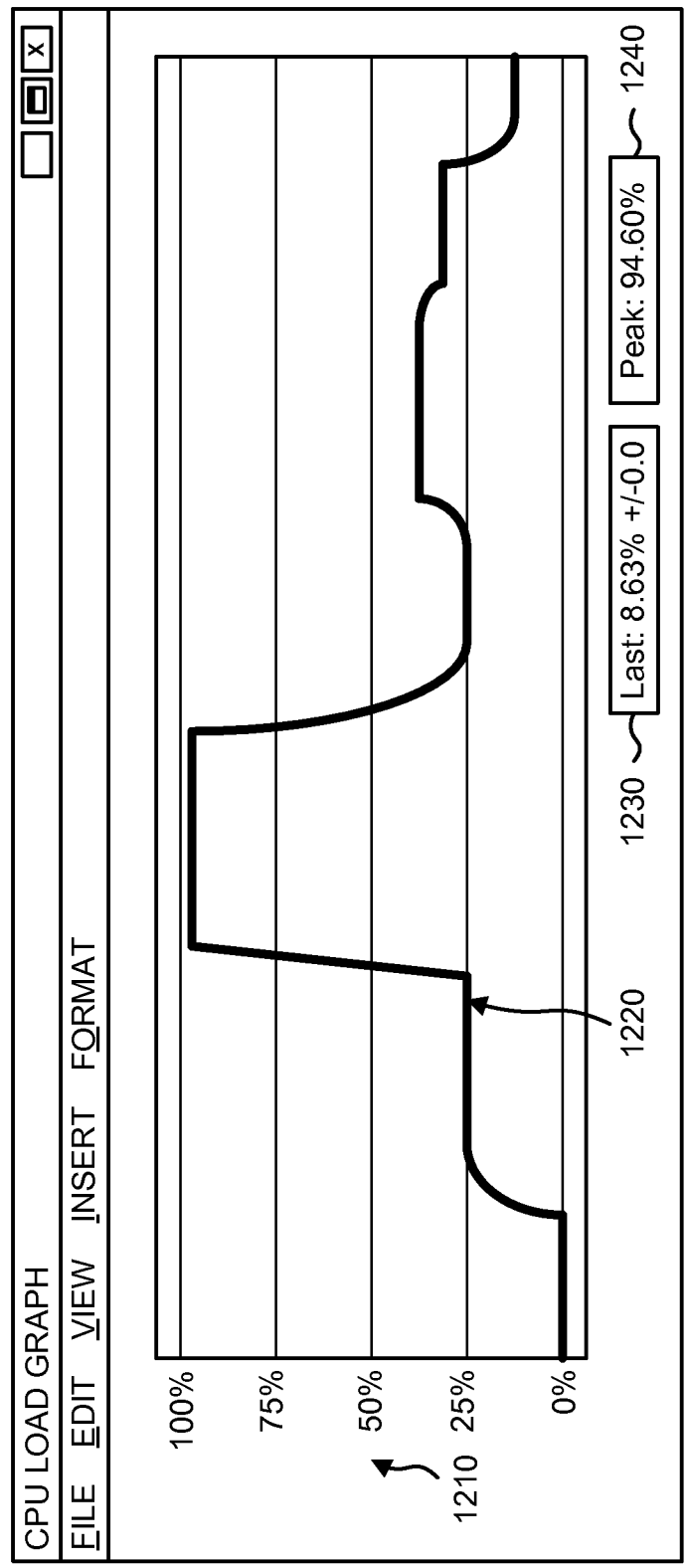

As shown in FIG. 12, user interface 1200 may include profiler feedback information (e.g., provided by profiler results 460) associated with target processor (e.g., CPU) load information corresponding to execution of an embedded code. For example, user interface 1200 may include a scale 1210, a load graph 1220, last entry information 1230, and/or peak entry information 1240.

Scale 1210 may include a scale (e.g., a percent CPU load) providing an indication of the percent load experienced by the target processor during execution of the embedded code. Load graph 1220 may provide visual indication (e.g., a line graph) showing the load (e.g., in percent) experienced by the target processor during execution of the embedded code. Last entry information 1230 may include information (e.g., a percent load—"8.63%+/−0.0") associated with a last entry of line graph 1220. Peak entry information 1240 may include information (e.g., a peak percent load—"94.60%") associated with a peak entry of line graph 1220.

Figure 13:
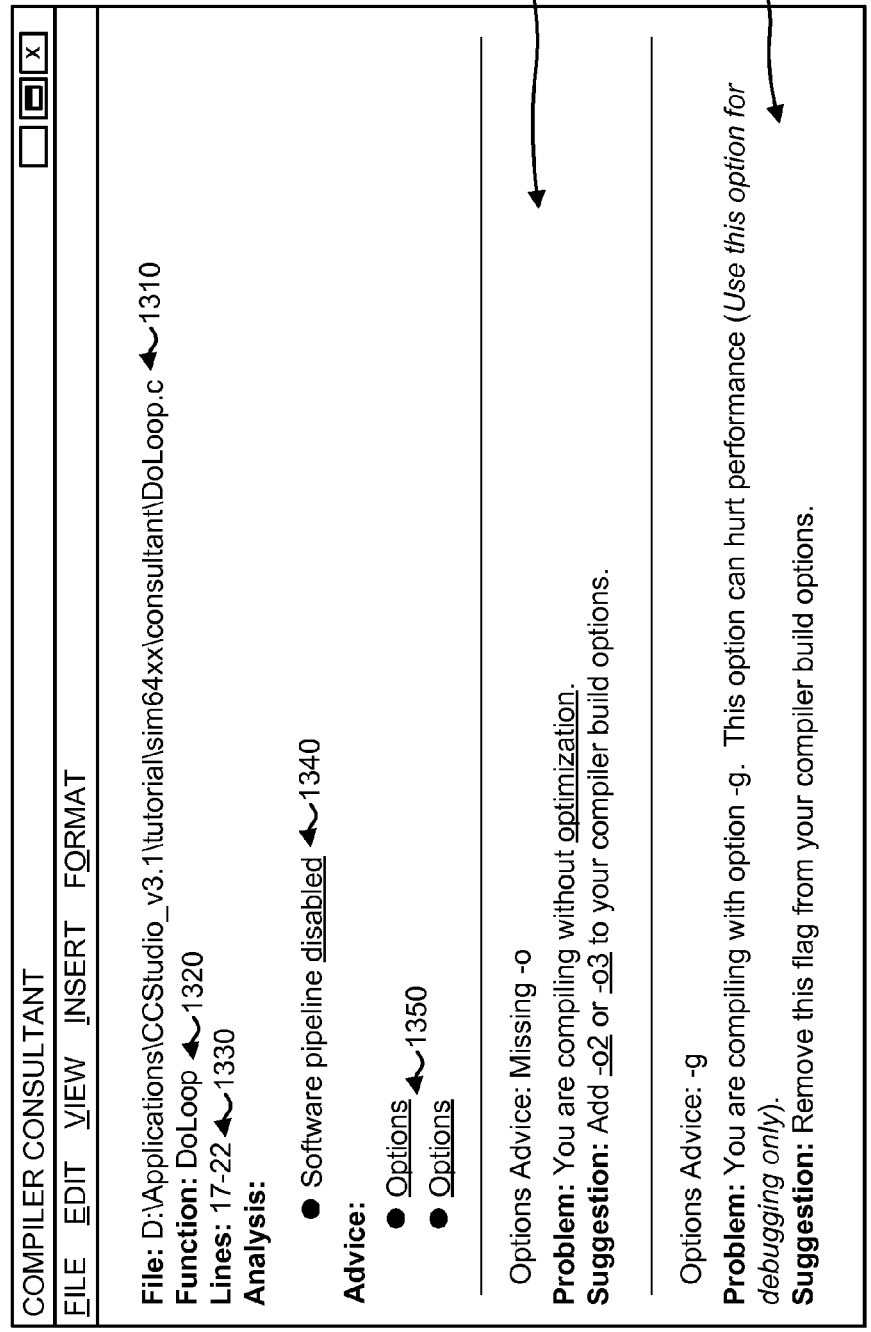

As shown in FIG. 13, user interface 1300 may include profiler feedback information (e.g., provided by profiler results 460) associated with execution of an embedded code. For example, user interface 1300 may include a file section 1310, a function section 1320, a lines section 1330, an analysis section 1340, an advice section 1350, a first options advice section 1360, and/or a second options advice section 1370.

File section 1310 may include information associated with a file corresponding to the embedded code. For example, file section 1310 may include a file name (e.g., "D:\Applications\CCStudio_v3.1\tutorials\sim64xx\consultant\DoLoop.c") associated with the embedded code. Function section 1320 may include information associated with a function corresponding to the file provided in file section 1310. For example, function section 1320 may include a function name (e.g., "DoLoop") associated with the file provided in file section 1310. Lines section 1330 may include information associated with line numbers of the embedded code corresponding to the file provided in file section 1310. For example, lines section 1330 may indicate that the file of file section 1310 is provided at line numbers "17-22" of the embedded code.

Analysis section 1340 may provide information associated with an analysis corresponding to the file provided in file section 1310. For example, analysis section 1350 may include analysis information (e.g., "Software pipeline disabled") corresponding to the file provided in file section 1310. Advice section 1350 may provide information associated with advice to address any problems provided in analysis section 1340. For example, advice section 1350 may include a first "Options" link and a second "Options" link that may provide advice to address any problems provided in analysis section 1340. If a user selects the first or second "Options" links, user interface 1300 may display first options advice section 1360 or second options advice section 1370, respectively. First options advice section 1360 and/or second options advice section 1370 may identify one or more problems (e.g., "You are compiling without optimization") associated with the file provided in file section 1310, and/or may provide one or more suggestions (e.g., "Add –o2 or –o3 to your compiler build options") to address the one or more problems.

Various optimizations may be performed (e.g., by TCE 120) iteratively by generating code, obtaining profiling information (e.g., execution time, compiler advice, memory usage statistics, cache profile, etc.) related to code efficiency (e.g., execution speed or memory footprint), and redirecting the automatic code generation process to modify the generated code based on feedback from the profiling results. TCE 120 may repeat this process in search of an optimal solution. Two criteria related to performance of an executable code may include execution speed and memory footprint. It may be desirable to have the executable code run as quickly as possible with as small of a memory footprint as possible. In many cases these two optimization goals may be contradictory. For example, reducing execution time of a for-loop or a while-loop via loop unrolling may increase instruction memory size.

FIGS. 14-17 depict examples of how profiling based optimization of code may be performed (e.g., using TCE 120). In a first example, TCE 120 may utilize a stack profiling tool to help reduce stack memory usage (e.g., by a target processor). TCE 120 may create and/or receive a model (e.g., model 420), and user interface 1400 of FIG. 14 may depict the model. The model depicted by user interface 1400 may include a system stack size of "8192" bytes (0x2000), and a stack size for an operating system (OS) task (e.g., generated via a task block in the model) of "4096" bytes. In one implementation, user interface 1400 may include a task block 1410, an Internet Protocol (IP) configuration block 1420, an algorithm block 1430, a target processor configuration block 1440, a build/reload/run block 1450, an information block 1460, and/or a view script block 1470.

Task block 1410 may generate a stack size for the OS task (e.g., "4096" bytes), and may provide the stack size to algorithm block 1430. IP configuration block 1420 may provide an IP configuration for target processor 1440. Algorithm block 1430 may receive the stack size from task block 1410, and may execute a function. Target processor configuration block 1440 may execute code generated by the model of user interface 1400. In one implementation, target processor configuration block 1440 may include a 32-bit processor. Build/reload/run block 1450 may enable a user to build the model (e.g., add blocks to the model), to reload the model (e.g., for execution), and/or to run (e.g., execute) the model. Information block 1460 may provide information associated with the model (e.g., block information, profiler information, etc.). View script block 1470 may enable a user to see a script associated with the model.

Figure 14:
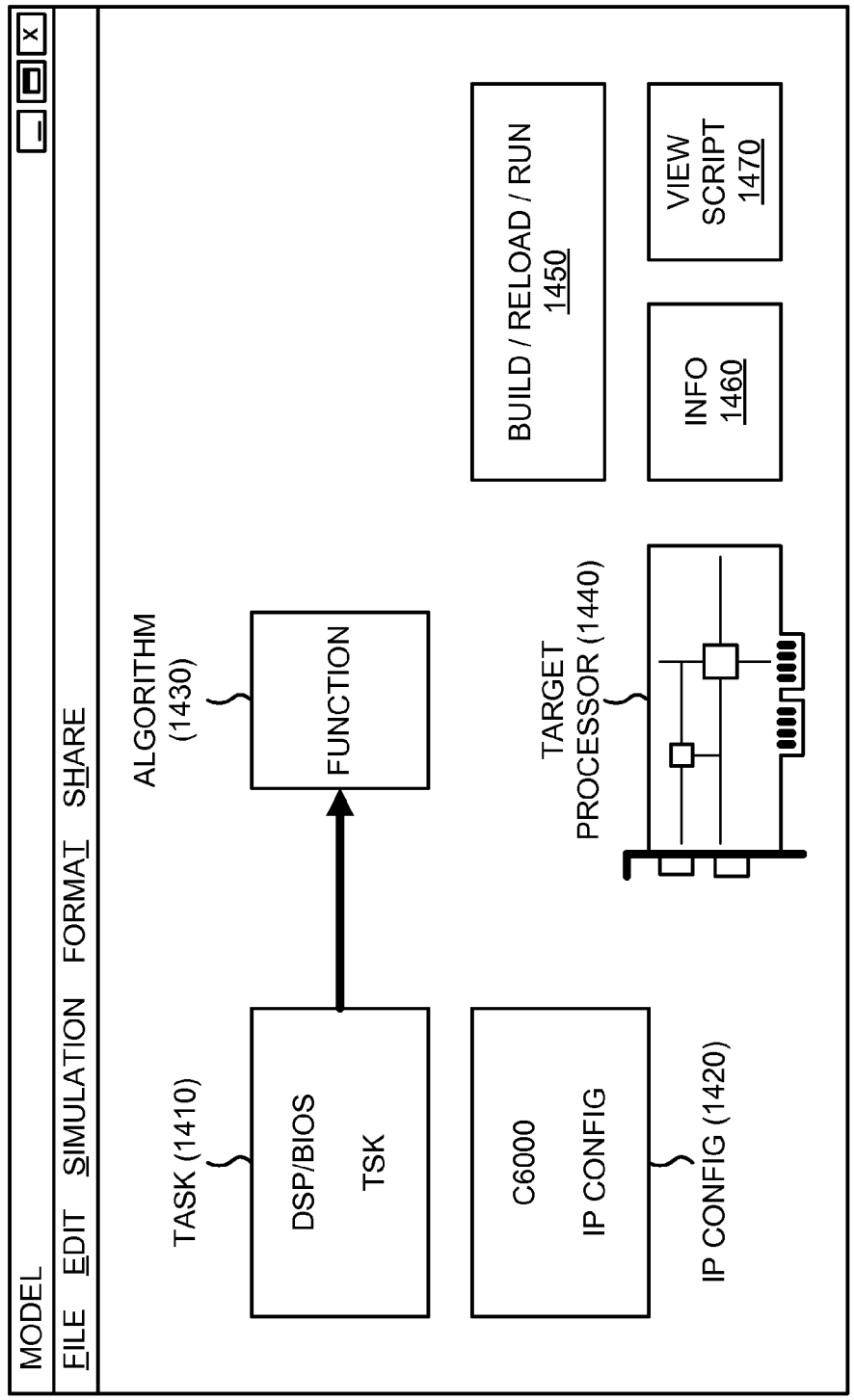
Figure 15:
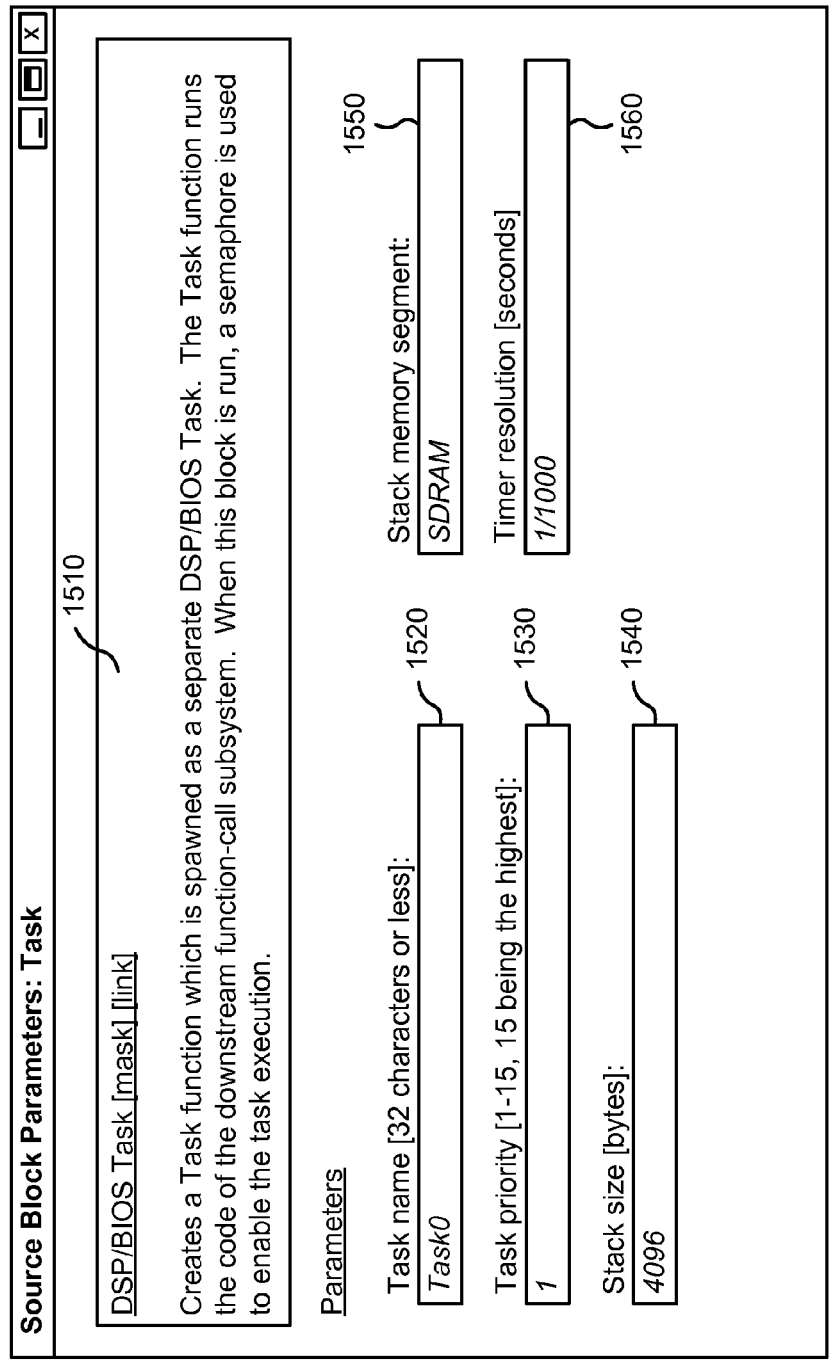

User interface 1500 of FIG. 15 may display settings for task block 1410 of the model depicted in FIG. 14. As illustrated, user interface 1500 may include an information section 1510, a task name section 1520, a task priority section 1530, a stack size section 1540, a stack memory segment section 1550, and/or a timer resolution section 1560.

Information section 1510 may include information (e.g., "Creates a Task function which is spawned as a separate DSP/BIOS Task . . . ") associated with the task provided by task block 1410. Task name section 1520 may enable a user to input a name for the task provided by task block 1410. Task priority section 1530 may enable a user to input a priority (e.g., "1-15, 15 being the highest") for the task provided by task block 1410. Stack size section 1540 may enable a user to input a stack size (e.g., "4096 bytes") for the task provided by task block 1410. Stack memory segment section 1550 may enable a user to input a stack memory segment (e.g., "SDRAM") for the task provided by task block 1410. Timer resolution section 1560 may enable a user to input a timer resolution (e.g., "1/1000 seconds") for the task provided by task block 1410.

The information provided by user interface 1500 may include initial settings for the stack size that may be greater than the optimal stack size, and/or may not reflect the actual stack size needed for successful code execution. Because of the possibility of recursive function calls and/or code pieces that are not visible to automatic code generator 405 (e.g., operating system kernel code, run-time libraries with no source code, etc.), static estimation of the stack size without executing the code may be difficult to determine for certain classes of applications.

However, TCE 120 may execute an algorithm to determine the stack size. For example, if an initial estimate for the stack size is "8192" bytes and an initial estimate for the stack size of the OS task is "4096" bytes, TCE 120 may download an executable code, and execute a series of tests based on the executable code. During execution of the series of tests, a stack profiling tool (e.g., a kernel object viewer) may be activated by TCE 120. TCE 120 may halt execution of the series of tests, and/or may collect stack size usage statistics using the stack profiling tool. In one example, peak stack usage for the system stack may be determined (e.g., to be "336" bytes), and peak stack usage for task block 1410 may be determined (e.g., to be "1432" bytes). The total stack size used in this example for the system stack and task block (e.g., "1768" bytes) may be lower than the initial estimate (e.g., of "12288" bytes="8192" bytes+"4096" bytes). Based on this information, TCE 120 may regenerate the code by setting stack sizes to "1432" and "336" bytes, and may save "10520" bytes of memory.

A second example may relate to improving code execution speed by utilizing a compiler consultant feature. While generating executable output for a high level language such as the C language, a compiler may generate advice and may suggest specific actions to make the C code more efficient. In this example, a do-while loop may be optimized by using feedback obtained from the compiler consultant feature. In a first step, code may be generated for implementation of the following mathematical equation:

$$A=B*\text{weight1}+C*\text{weight2}; \quad (1)$$

where, A, B and C may be vectors of a size N, weight1>0, weight2<1, and weight1+weight2=1. Equation (1) may describe a weighted averaging of two vectors, and may be translated into the following C-function:

```
void DoLoop(short*Input1, short*Input2, short*Output, short*Weights, int LoopCount)
{
    int i, Vector1, Vector2;
    short Weight1=Weights[0];
    short Weight2=Weights[1];
    for (i=0; i<LoopCount; i++)
    {
        Vector1=Input1[i]*Weight1;
        Vector2=Input2[i]*Weight2;
        Output[i]=(Vector1+Vector2)>>15;
    }
}
```

If the C-code is compiled with initial build options, the compiler may offer advice depicted in user interface 1600 of FIG.

16. As illustrated, user interface 1600 may include a function section 1610 and/or an options advice section 1620.

Function section 1610 may include a file name (e.g., "Filename") associated with a function (e.g., "DoLoop"), a function (e.g., "DoLoop"), lines of code where the function may be located (e.g., lines "17-22"), analysis information (e.g., "Software pipelining disabled"), and/or advice information (e.g., "Options" links). If a user selects one of the "Options" links, options advice section 1620 may be provided by user interface 1600.

Options advice section 1620 may include options advice information (e.g., "Missing –o"), problem information (e.g., "You are compiling without optimization"), and/or suggestion information (e.g., "Add –o2 or –o3 to your compiler build options"). Information associated with options advice section 1620 may be stored as a text file, and may be read and/or analyzed automatically by a script file (e.g., a MATLAB® M language script, etc.).

During the initial compilation, optimization may not be turned on, and the compiler may detect this issue and report it immediately. However, this loop may execute "1080" instruction cycles without compiler optimization. Based on analyzing the information presented by user interface 1600, a second code generation may be initiated, but this time the optimization may be turned on. After turning on the optimization, profiling results may indicate that the loop takes about "76" instructions cycles.

Figure 17:
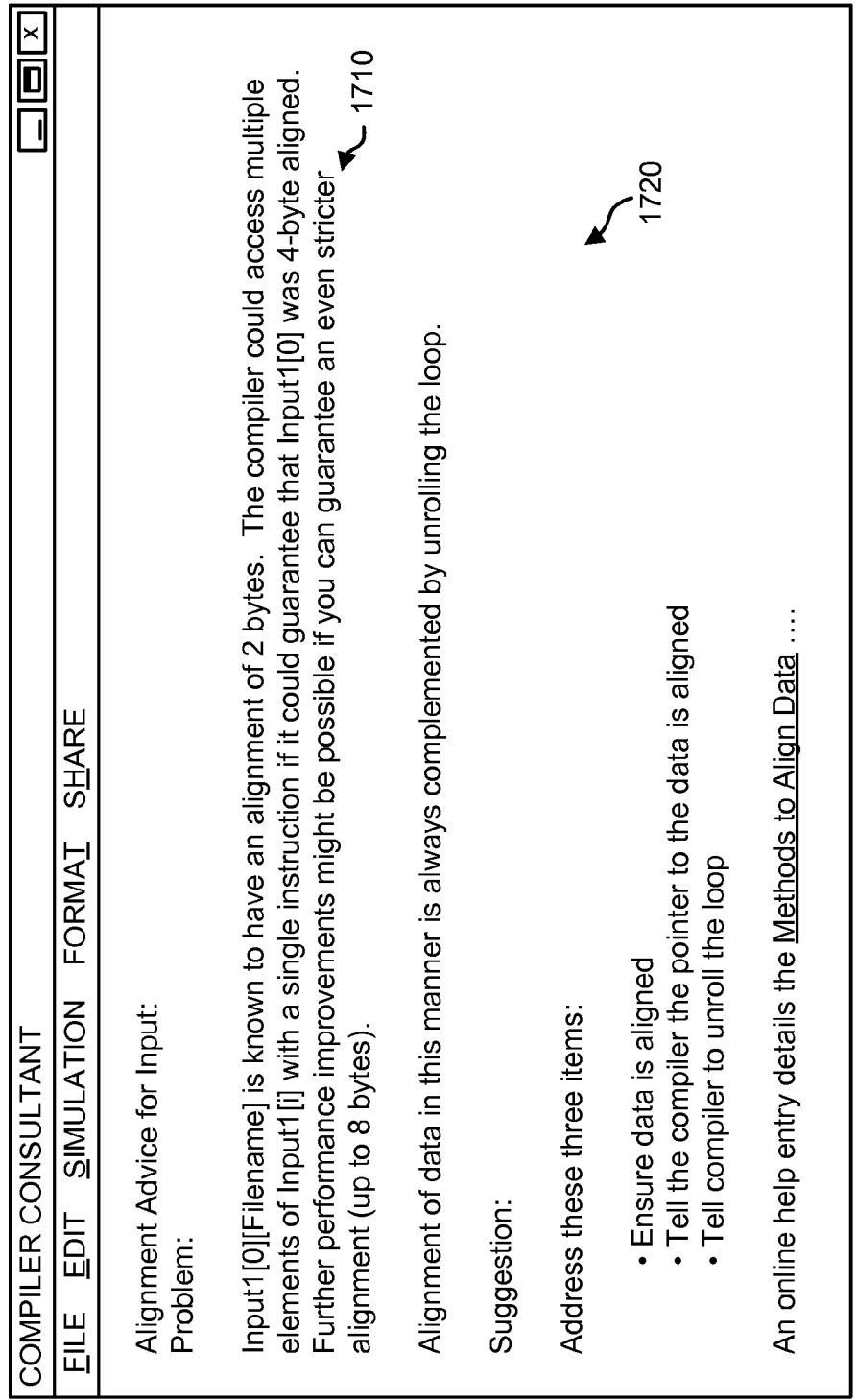

After the second code generation, user interface 1700 of FIG. 17 may be provided. As illustrated, in the second code generation, user interface 1700 may generate more advice. For example, user interface 1700 may describe a data alignment problem where a pointer (e.g., "Input1[ ]") is known to be aligned to a "2" byte boundary, as indicated by reference number 1710. As further indicated by reference number 1710, if the alignment can be made "4" bytes, then the compiler can use this information to load multiple elements of a vector (e.g., "Input1[ ]"), which may reduce memory access time by a half. As further shown in FIG. 17, user interface 1700 may include a detailed suggestion section 1720 that may provide detailed advice information relating to the problem identified at reference number 1710.

The compiler consultant may also report that the compiler cannot determine if Input1[ ], Input2[ ], and Output[ ] point to non-overlapping memory locations (even though that may be the case), and therefore may not fully optimize the loop. If it was known to the compiler that Input1, Input2, and Output are non-overlapping regions of memory, the compiler may have eliminated some data dependencies, and may generate more efficient code. Therefore, the code may be regenerated with a "restrict" qualifier (e.g., to denote non-overlapping memory for Input1, Input2, and Output). If the generated application is executed and execution of the code is profiled, the profiling information may indicate that a single iteration of the loop takes "76" cycles.

Based on the analysis of the compiler advice obtained during the second generation of the code, the source C-code may be modified as follows:

```
void DoLoop(short*restrict Input1, short*restrict Input2,
short*restrict Output, short*Weights, int LoopCount)
{
  int i, Vector1, Vector2;
  short Weight1=Weights[0];
  short Weight2=Weights[1];
  ALIGNED_ARRAY(Input1);
  ALIGNED_ARRAY(Input2);
  ALIGNED_ARRAY(Output);
  #pragma MUST_ITERATE(,,2);
  for (i=0; i<LoopCount; i++)
  {
    Vector1=Input1[i]*Weight1;
    Vector2=Input2[i]*Weight2;
    Output[i]=(Vector1+Vector2)>>15;
  }
}
```

As shown by the modified C-code, "#pragma" statements and ALIGNED_ARRAY statements may be inserted, and a restrict keyword may be added as a qualifier to function inputs. Use of the restrict keyword may indicate to the compiler that Input1 [ ], Input2[ ], and Output[ ] arrays do not overlap in memory. ALIGNED_ARRAY statements may indicate to the compiler that inputs may be aligned in memory to allow a maximum number of bytes to be loaded at each memory access. The MUST_ITERATE pragma statement may provide the compiler with properties of a trip count (e.g., a number of times the loop iterates) of the loop, and may include the following syntax:

pragma MUST_ITERATE([min, max, multiple]);

where the arguments "min" and "max" may include programmer-guaranteed minimum and maximum trip counts (e.g., obtained from TCE 120).

After these modifications to the original C-code, the code may be compiled and executed, and execution profiling statistics may be obtained. This time, the profiler may indicate that the loop has run in "36" cycles (e.g., compared to the original number of "1080" cycles, this may represent a thirty times (30×) improvement in code execution speed).

Although FIGS. 9-17 show exemplary elements of user interfaces 900-1700, in other implementations, user interfaces 900-1700 may include fewer, different, or additional elements than depicted in FIGS. 9-17. In still other implementations, one or more elements of user interfaces 900-1700 may perform some or all of the tasks described as being performed by one or more other elements of user interfaces 900-1700.

Exemplary Processes

Figure 18:
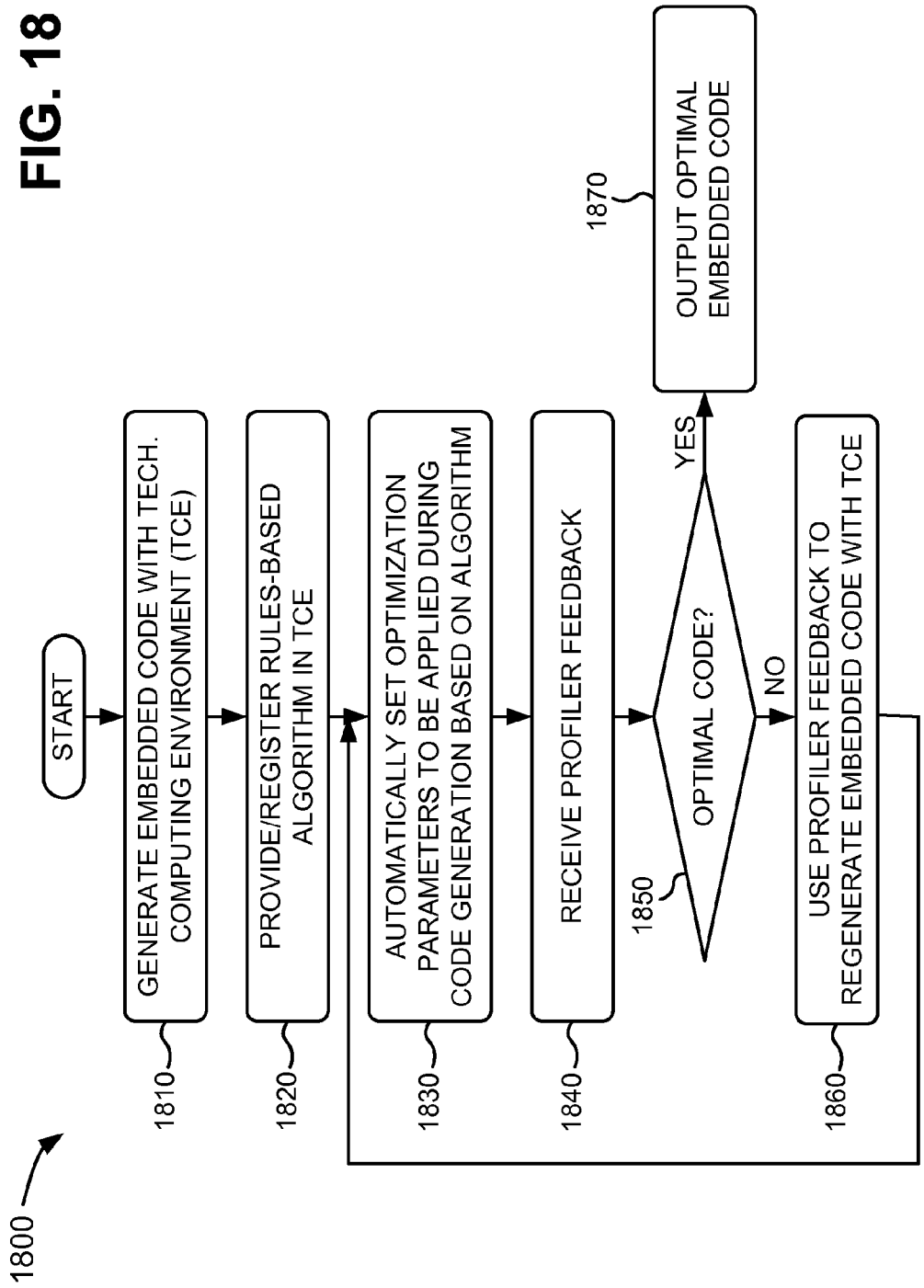
Figure 19:
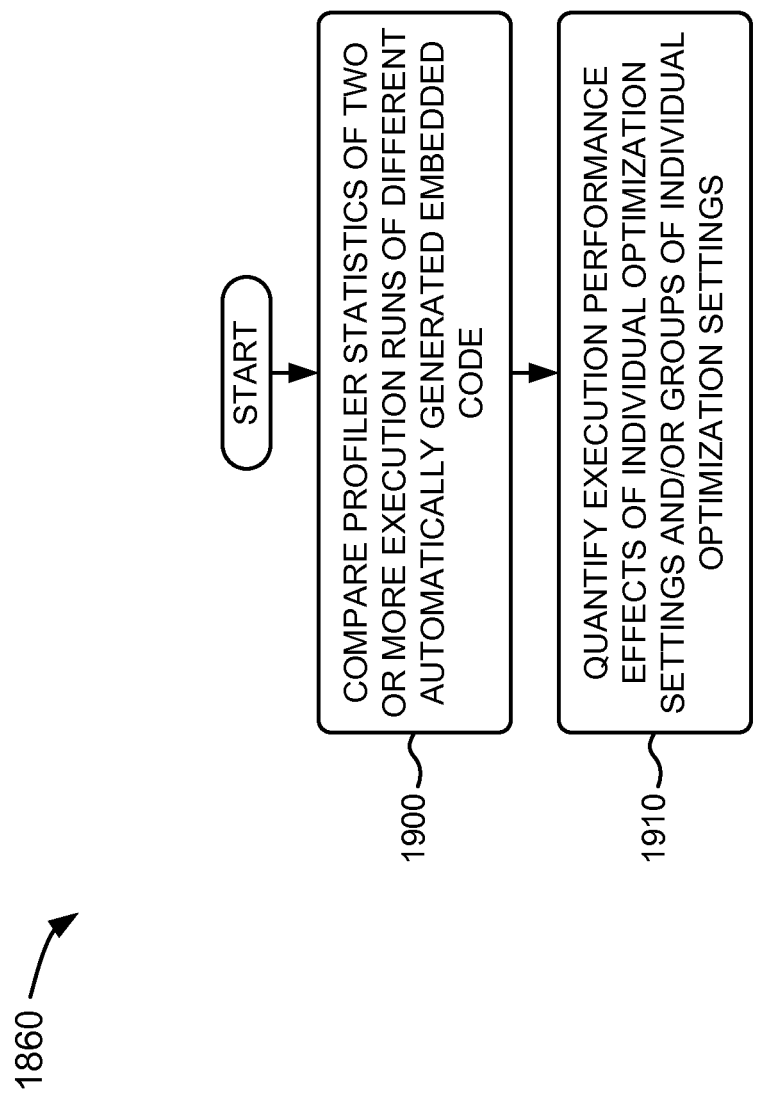

FIGS. 18-20 depict flow charts of exemplary processes for automatically generating optimized code based on profiler feedback according to implementations described herein. The processes of FIGS. 18-20 may be performed by one or more software and/or hardware components within device 110. Alternatively, the processes of FIGS. 18-20 may be performed by one or more software and/or hardware components within another device or a group of devices separate from or including device 110.

As shown in FIG. 18, a process 1800 may begin with generation of embedded code with a technical computing environment (TCE) based on received information (block 1810), and/or providing and/or registering a rules-based algorithm in the TCE (block 1820). For example, in one implementation described above in connection with FIGS. 4 and 5, automatic code generator 405 of TCE 120 may receive input files 415 and/or model 420, and may generate embedded code (e.g., source code files 435, linker files 440, object code 445, and/or program 450) based on the received input files 415 and/or model 420. The embedded code may be provided and/or registered in profiler-based optimizer 400 (e.g., within optimization algorithms 500) of TCE 120. Profiler-based optimizer 400 may collect static profiler results (e.g., profile results 460) based on the embedded code generated by automatic code generator 405.

As further shown in FIG. 18, optimization parameters to be applied during code generation may be automatically set based on the algorithm (block 1830), and/or profiler feedback may be received (block 1840). For example, in one implementation described above in connection with FIGS. 4 and 5, profiler-based optimizer 400 may automatically set optimization parameters to be applied during code generation (e.g., by automatic code generator 405) based on an algorithm (e.g., provided by optimization algorithms 500). TCE 120 may execute the embedded code, and profiler-based optimizer 400 may collect run-time profiler results (e.g., profiler results 460) based on execution of the embedded code.

Returning to FIG. 18, if the generated code is determined to be optimal (block 1850—YES), the optimal embedded code may be output (block 1870). Otherwise (block 1850—NO), the profiler feedback may be used to regenerate the embedded code with the TCE (block 1860) and process 1800 may return to block 1830. For example, in one implementation described above in connection with FIG. 4, profiler-based optimizer 400 may determine if the generated embedded code is optimal (e.g., if execution performance of the code converges to optimal). If the embedded code is optimal, TCE 120 may output the optimal embedded code. If the embedded code is not optimal, profiler results 460 may be used to automatically update the optimization parameters to be applied during code generation, and automatic code generator 405 may regenerate the embedded code based on the updated information.

Process block 1860 may include the process blocks depicted in FIG. 19. As illustrated, process block 1860 may include comparing profiler statistics of two or more execution runs of different automatically generated embedded code (block 1900), and/or quantifying execution performance effects of individual optimization settings and/or groups of individual optimization settings (block 1910). For example, in one implementation described above in connection with FIG. 4, profiler results 460 of two or more execution runs of different automatically generated embedded code may be compared (e.g., by profiler-based optimizer 400) to determine if the embedded code is optimal. In another example, profiler-based optimizer 400 may quantify execution performance effects of individual and/or groups of optimization settings to determine if the embedded code is optimal.

As shown in FIG. 20, a process 2000 may begin with setting a best performance of previously generated code relative to memory usage and/or execution performance to a value (block 2005), and/or generating code from a model (block 2010). For example, in one implementation described above in connection with FIG. 4, profiler-based optimizer 400 of TCE 120 may set a best performance of previously generated code (e.g., relative to memory usage and/or execution time) to a value (e.g., infinity), and/or automatic code generator 405 of TCE 120 may generate embedded code from model 420.

Returning to FIG. 20, static profiler results may be collected based on the generated code (block 2015), and/or the generated code may be executed (block 2020). For example, in one implementation described above in connection with FIG. 4, profiler-based optimizer 400 may collect static profiler results (e.g., profile results 460) based on the embedded code generated by automatic code generator 405, and/or TCE 120 may execute the embedded code.

As further shown in FIG. 20, run-time profiler results may be collected (block 2025), and/or the static and run-time profiler results may be provided for a determination of a next trial set (block 2030). For example, in one implementation described above in connection with FIG. 4, profiler-based optimizer 400 may collect run-time profiler results (e.g., profiler results 460) based on execution of the embedded code. The profiler results (e.g., both static and run-time profiler results) may be provided to profiler-based optimizer 400, and profiler-based optimizer 400 may determine a next trial based on the profiler results if more trials remain.

Returning to FIG. 20, it may be determined if a current performance of the generated code is less than the best performance (block 2035). If the current performance is less than the best performance (block 2035—YES), the best performance may be set to the current performance (block 2040). For example, in one implementation described above in connection with FIG. 4, profiler-based optimizer 400 may determine if a current performance (e.g., execution time, where a lower execution time indicates a better performance) of the embedded code relative to memory usage and/or execution performance is less than the best performance. If the current performance of the embedded code is less than the best performance, profiler-based optimizer 400 may set the best performance to the current performance.

As further shown in FIG. 20, it may be determined if the current performance is less than a threshold (block 2045). If the current performance is less than the threshold (block 2045—YES), the generated code may be determined to be optimal (block 2050). For example, in one implementation described above in connection with FIG. 4, profiler-based optimizer 400 may determine if the current performance is less than a threshold. If the current performance is less than the threshold, profiler-based optimizer 400 may determine that the embedded code is optimal, and may set the optimal embedded code equal to generated code corresponding to a best trial.

Returning to FIG. 20, if the current performance is greater than the best performance (block 2035- NO), and/or the current performance is greater than the threshold (block 2045—NO), it may be determined if more trials remain (block 2055). If more trials remain (block 2055—YES), a next trial set may be determined (block 2030). If no more trials remain (block 2055—NO), the generated code may be determined to be optimal. For example, in one implementation described above in connection with FIG. 4, if the current performance is greater than the best performance and/or the current performance is greater than the threshold, profiler-based optimizer 400 may determine a next trial based on the profiler results if more trials remain, and the process may be repeated until no trials remain. If no trials remain, profiler-based optimizer 400 may determine that the embedded code is optimal, and may set the optimal embedded code equal to generated code corresponding to a best trial.

CONCLUSION

Implementations described herein may utilize profiler feedback to automatically generate optimal embedded code for a target processor with a TCE. For example, in one implementation, the TCE may receive target processor information, and/or may generate embedded code based on the target processor information. The TCE may receive profiler feedback statistics based on the generated code, and/or may use the profiler feedback statistics to regenerate the embedded code until an optimal embedded code is achieved.

Although exemplary implementations described herein use one or more representations (e.g., languages, pseudocode, etc.), other implementations and/or examples may be described and/or implemented using other representations.

The foregoing description of implementations provides illustration and description, but is not intended to be exhaustive or to limit the invention to the precise form disclosed. Modifications and variations are possible in light of the above teachings or may be acquired from practice of the invention.

While series of acts have been described with regard to FIGS. 18-20, the order of the acts may be modified in other implementations. Further, non-dependent acts may be performed in parallel.

It will be apparent that aspects, as described above, may be implemented in many different forms of software, firmware, and hardware in the implementations illustrated in the figures. The actual software code or specialized control hardware used to implement aspects described herein is not limiting of the invention. Thus, the operation and behavior of the aspects were described without reference to the specific software code—it being understood that one would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium comprising:
    one or more instructions, executable by at least one processor, to register an algorithm related to a target processor;
    one or more instructions, executable by the at least one processor, to automatically set parameters based on the algorithm;
    one or more instructions, executable by the at least one processor, to acquire information associated with the target processor;
    one or more instructions, executable by the at least one processor, to generate a first code based on the algorithm, the set parameters, and the information associated with the target processor;
    one or more instructions, executable by the at least one processor, to identify first feedback associated with execution of the first code;
    one or more instructions, executable by the at least one processor, to determine, based on the first feedback, whether the execution of the first code satisfies a criteria;
    one or more instructions, executable by the at least one processor, to automatically update, when the execution of the first code does not satisfy the criteria, the parameters based on the first feedback;
    one or more instructions, executable by the at least one processor, to automatically generate a second code based on the algorithm, the updated parameters, and the information associated with the target processor;
    one or more instructions, executable by the at least one processor, to identify second feedback associated with execution of the second code; and
    one or more instructions, executable by the at least one processor, to determine, based on the second feedback, whether the execution of the second code satisfies the criteria.

2. The non-transitory computer-readable medium of claim 1, further comprising:
    one or more instructions to automatically revise, when the execution of the second code does not satisfy the criteria, the updated parameters based on the second feedback; and
    one or more instructions to automatically generate a third code based on the algorithm, the revised parameters, and the information associated with the target processor.

3. The non-transitory computer-readable medium of claim 1, where the information associated with the target processor includes information associated with at least one of:
    an architecture associated with the target processor,
    a compiler setting associated with the target processor,
    an operating system behavior associated with the target processor,
    a specific function associated with the target processor, or
    a configuration setting associated with the target processor.

4. The non-transitory computer-readable medium of claim 1, where the one or more instructions to determine whether the execution of the second code satisfies the criteria include:
    one or more instructions to compare the first feedback and the second feedback;
    one or more instructions to identify, based on comparing the first feedback and the second feedback, a change associated with execution of the second code relative to execution of the first code; and
    one or more instructions to determine whether the change satisfies the criteria.

5. The non-transitory computer-readable medium of claim 1, where the criteria is associated with a convergence of the set parameters and the updated parameters.

6. The non-transitory computer-readable medium of claim 1, where the criteria is associated with at least one of:
    unrolling a particular number of encoded loops,
    removing a particular number of aliased pointers,
    improving usage of a cache associated with the target processor,
    a particular resizing of a system stack or a task stack,
    a particular usage of a buffer,
    removal of one or more scheduling bottlenecks,
    removal of one or more timing issues,
    a particular amount of load balancing across two or more tasks, or
    a particular amount of load balancing across two or more computational components.

7. The non-transitory computer-readable medium of claim 1, where the criteria is associated with at least one of:
    a particular usage of a memory associated with the target processor,
    a particular latency associated with the target processor,
    a particular amount of throughput associated with the target processor,
    a particular amount of power usage by the target processor,
    a particular behavior of a compiler associated with the target processor,
    a particular amount of throughput associated with a system associated with the target processor,
    a particular latency associated within the system,
    a particular latency associated with input/output operations associated with the target processor,
    a particular amount of communications between two or more processes associated with the target processor, or a particular amount of communications between the target processor and another computational component.

8. The non-transitory computer-readable medium of claim 1, where the criteria is defined relative to at least one of:
an amount of usage of the target processor,
an amount of usage of a memory associated with the target processor, or
a number of logical operations associated with one of the first code or the second code.

9. The non-transitory computer-readable medium of claim 1, where the algorithm is received from at least one of a web service or a parallel processing program.

10. A system comprising:
one or more processors to:
register an algorithm related to a target processor;
automatically set parameters based on the algorithm;
acquire information associated with the target processor;
generate a first code based on the algorithm, the set parameters, and the information associated with the target processor;
identify first feedback associated with execution of the first code;
automatically update the parameters based on the first feedback;
automatically generate a second code based on the algorithm, the updated parameters, and the information associated with the target processor;
identify second feedback associated with execution of the second code; and
determine, based on the second feedback, whether the execution of the second code satisfies a criteria.

11. The system of claim 10, where the one or more processors are further to:
revise, when the execution of the second code does not satisfy the criteria, the updated parameters based on the second feedback; and
automatically generate a third code based on the algorithm, the revised parameters, and the information associated with the target processor.

12. The system of claim 10, where the one or more processors, when acquiring the information associated with the target processor, are further to:
acquire information associated with at least one of:
an architecture associated with the target processor,
a compiler setting associated with the target processor,
an operating system behavior associated with the target processor,
a specific function associated with the target processor, or
a configuration setting associated with the target processor.

13. The system of claim 10, where the one or more processors, when determining whether the execution of the second code satisfies the criteria, are further to:
compare the first feedback and the second feedback;
identify, based on comparing the first feedback and the second feedback, a change associated with execution of the second code relative to execution of the first code; and
determine whether the change satisfies the criteria.

14. The system of claim 10, where the one or more processors, when determining whether the execution of the second code satisfies the criteria, are further to:
determine whether the execution of the second code satisfies the criteria based on a convergence of the set parameters and the updated parameters.

15. The system of claim 10, where the one or more processors, when determining whether the execution of the second code satisfies the criteria, are further to:
determine whether the execution of the second code satisfies the criteria based on at least one of:
unrolling a particular number of encoded loops,
removing a particular number of aliased pointers,
improving usage of a cache associated with the target processor,
a particular resizing of a system stack or a task stack,
a particular usage of a buffer,
removal of one or more scheduling bottlenecks,
removal of one or more timing issues,
a particular amount of load balancing across two or more tasks, or
a particular amount of load balancing across two or more computational components.

16. The system of claim 10, where the one or more processors, when determining whether the execution of the second code satisfies the criteria, are further to:
determine whether the execution of the second code satisfies the criteria based on at least one of:
a particular usage of a memory associated with the target processor,
a particular latency associated with the target processor,
a particular amount of throughput associated with the target processor,
a particular amount of power usage by the target processor,
a particular behavior of a compiler associated with the target processor,
a particular amount of throughput associated with a system associated with the target processor,
a particular latency associated within the system,
a particular latency associated with input/output operations associated with the target processor,
a particular amount of communications between two or more processes associated with the target processor, or
a particular amount of communications between the target processor and another computational component.

17. The system of claim 10, where the one or more processors, when determining whether the execution of the second code satisfies the criteria, are further to:
determine whether the execution of the second code satisfies the criteria based on at least one of:
an amount of usage of the target processor,
an amount of usage of a memory associated with the target processor, or
a number of logical operations associated with one of the first code or the second code.

18. A method comprising:
registering an algorithm related to a target processor;
determining parameters based on the algorithm;
acquiring information associated with the target processor; and
generating code based on the algorithm, the determined parameters, and the information associated with the target processor, the generating of the code including:
identifying feedback associated with execution of the code,
determining, based on the feedback, whether the code satisfies a criteria,
updating the parameters based on the feedback,
revising the code based the updated parameters, and
repeating the identifying, the determining, the updating, and the revising until the code satisfies the criteria, the registering, the determining of the parameters, the acquiring, and the generating being performed by one or more processors.

19. The method of claim 18, where acquiring the information associated with the target processor includes:
   acquiring information associated with at least one of:
      an architecture associated with the target processor,
      a compiler setting associated with the target processor,
      an operating system behavior associated with the target processor,
      a specific function associated with the target processor, or
      a configuration setting associated with the target processor.

20. The method of claim 18, where determining whether the code satisfies the criteria includes:
   comparing the feedback associated with the execution of the code and feedback associated with the revised code; and
   determining whether the revised code satisfies the criteria based on the comparing.

21. The method of claim 18, where determining whether the code satisfies the criteria includes:
   determining whether the code satisfies the criteria based on a convergence of the updated parameters to particular values.

22. The method of claim 18, where determining whether the code satisfies the criteria includes:
   determining whether the code satisfies the criteria based on at least one of:
      unrolling a particular number of encoded loops,
      removing a particular number of aliased pointers,
      improving usage of a cache associated with the target processor,
      a particular resizing of a system stack or a task stack,
      a particular usage of a buffer,
      removal of one or more scheduling bottlenecks,
      removal of one or more timing issues,
      a particular amount of load balancing across two or more tasks, or
      a particular amount of load balancing across two or more computational components.

23. The method of claim 18, where determining whether the code satisfies the criteria includes:
   determining whether the code satisfies the criteria based on at least one of:
      a particular usage of a memory associated with the target processor,
      a particular latency associated with the target processor,
      a particular amount of throughput associated with the target processor,
      a particular amount of power usage by the target processor,
      a particular behavior of a compiler associated with the target processor,
      a particular amount of throughput associated with a system associated with the target processor,
      a particular latency associated within the system,
      a particular latency associated with input/output operations associated with the target processor,
      a particular amount of communications between two or more processes associated with the target processor, or
      a particular amount of communications between the target processor and another computational component.

24. The method of claim 18, where determining whether the code satisfies the criteria includes:
   determining whether the code satisfies the criteria based on at least one of:
      an amount of usage of the target processor,
      an amount of usage of a memory associated with the target processor, or
      a number of logical operations associated with one of the code.

* * * * *